United States Patent [19]
Hedrick

[11] Patent Number: 5,428,269
[45] Date of Patent: Jun. 27, 1995

[54] METHODS AND APPARATUS FOR IMPROVING CATHODE RAY TUBE IMAGE QUALITY

[75] Inventor: Geoffrey S. M. Hedrick, Malvern, Pa.

[73] Assignee: Innovative Soslutions and Support, Incorporated, Malverne, Pa.

[21] Appl. No.: 175,305

[22] Filed: Dec. 29, 1993

Related U.S. Application Data

[63] Continuation of Ser. No. 47,776, Apr. 15, 1993, Pat. No. 5,361,020, which is a continuation of Ser. No. 917,520, Jul. 17, 1992, abandoned, which is a continuation of Ser. No. 782,870, Oct. 15, 1991, abandoned, which is a continuation of Ser. No. 664,486, Mar. 4, 1991, abandoned, which is a continuation of Ser. No. 561,284, Aug. 1, 1990, abandoned, which is a continuation of Ser. No. 432,347, Nov. 6, 1989, abandoned, which is a continuation of Ser. No. 286,895, Dec. 20, 1988, abandoned, which is a continuation-in-part of Ser. No. 231,770, Aug. 12, 1988, abandoned.

[51] Int. Cl.⁶ .................... H01J 29/74; H01J 29/76
[52] U.S. Cl. ..................... 315/369; 315/370; 348/813
[58] Field of Search ............... 315/370, 369; 348/813, 348/811

[56] References Cited

U.S. PATENT DOCUMENTS 4,352,047  9/1982  Imayasu et al. .
4,369,396  1/1986  Judd .
4,635,107  1/1987  Turner .

*Primary Examiner*—Theodore M. Blum
*Attorney, Agent, or Firm*—Cohen, Pontani, Lieberman, Pavane

[57] ABSTRACT

A time-varying control signal is developed by a current sensor connecting the imaging screen and a closely proximate screen grid of a cathode ray tube as an imaging electron beam is operatively swept across the screen to produce images thereon. The control signal is processed and then applied to at least one of the tube operating elements—such as the horizontal and vertical deflection coils, the focusing lens, the electron beam generator and, in a plural beam tube, the convergence assembly—which controls a characteristic affecting the quality of an image. Specific arrangements for using the time-varying control signal to compensate for geometric image distortions affecting horizontal linearity and to increase the imaging resolution of the tube are disclosed.

92 Claims, 4 Drawing Sheets

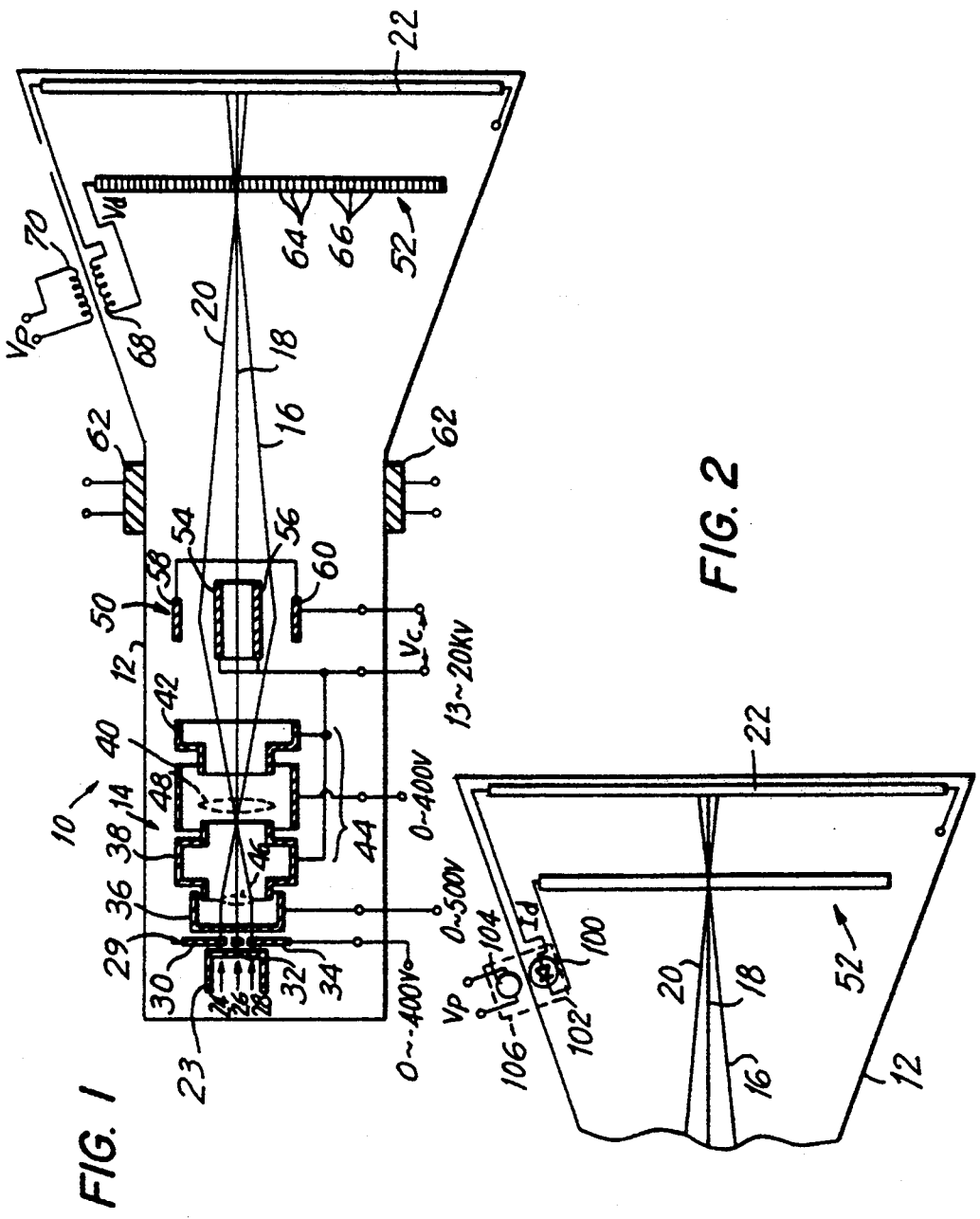

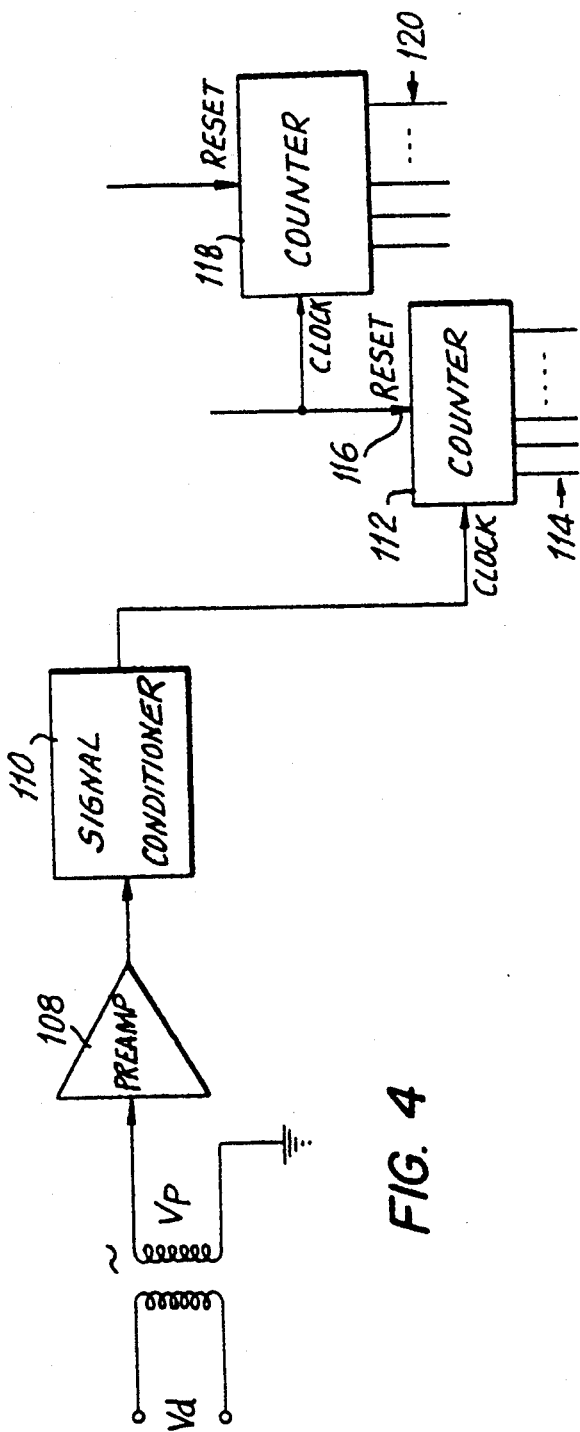
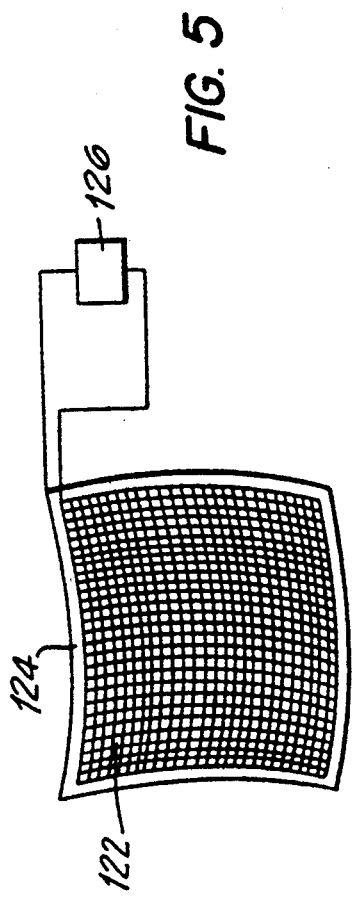
FIG. 4
FIG. 5

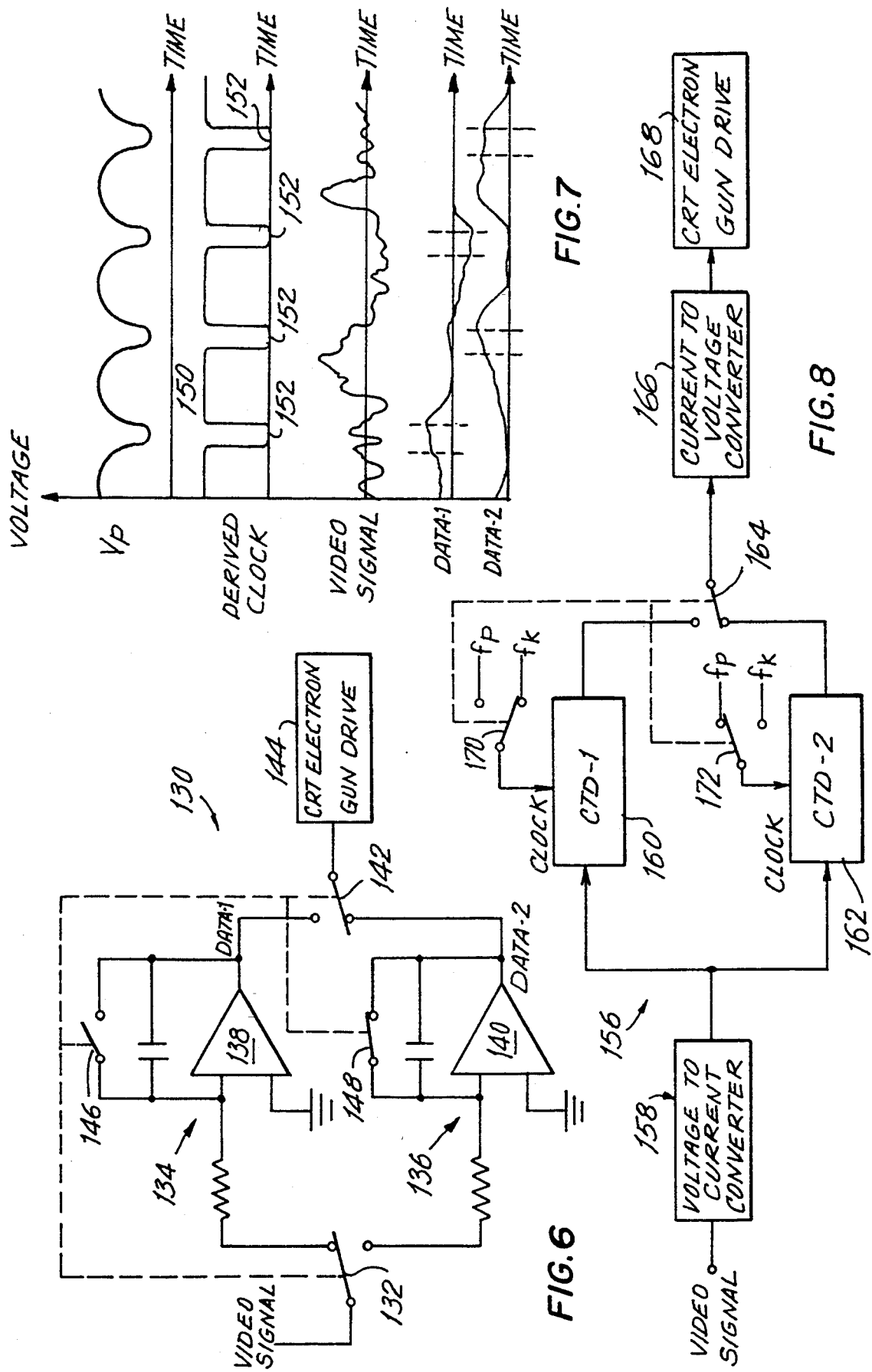

METHODS AND APPARATUS FOR IMPROVING CATHODE RAY TUBE IMAGE QUALITY

This application is a continuation of U.S. patent application Ser. No. 08/047,776 filed Apr. 15, 1993, now U.S. Pat. No. 5,361,020, which is a continuation of U.S. patent application Ser. No. 07/917,520 filed Jul. 17, 1992, now abandoned, which is a continuation of U.S. patent application Ser. No. 07/782,870 filed Oct. 15, 1991, now abandoned, which is a continuation of U.S. patent application Ser. No. 07/664,486 filed Mar. 4, 1991, now abandoned, which is a continuation of U.S. patent application Ser. No. 07/561,284 filed Aug. 1, 1990, now abandoned, which is a continuation of U.S. patent application Ser. No. 07/432,347 filed Nov. 6, 1989, now abandoned, which is a continuation of U.S. patent application Ser. No. 07/286,895 filed Dec. 20, 1988, now abandoned, which is a continuation-in-part of U.S. patent application Ser. No. 07/231,770 filed Aug. 12, 1988, now abandoned.

FIELD OF THE INVENTION

The present invention relates to the formation of images on the imaging screens of cathode ray tubes and, in particular, to apparatus and methods of producing such images of enhanced and improved quality.

BACKGROUND OF THE INVENTION

In the operation of conventional cathode ray tubes (CRT's), such for example as those utilized in television receivers and monitors, an image is created by generating one (for monochrome images) or a plurality (for color tubes) of modulated electron beams and continuously sweeping the beams across an imaging screen to thereby selectively excite the phosphors or other coatings on the screen. Scanning movement of the beam(s) about the imaging screen is effected by the application of time-varying control voltages to horizontal and vertical deflection coils or yokes. Beam focusing is carried out by applying suitable control voltages to one or, more typically, to a plurality of generally electrostatic lens elements. In color CRT's, convergence of the plural beams at a shadow mask or other screen grid disposed closely proximate the imaging screen is controlled by time-varying voltages applied to electrostatic deflection electrodes or to electromagnetic convergence coils, depending on the tube design.

Each of these electron beam controlling devices in a cathode ray tube directly affects the quality of the images generated on the imaging screen by operatively adjusting one or more parameters or affecting one or more characteristics of the image. The focusing or lens elements directly control the sharpness or definition of the image. The convergence electrodes or coils, by appropriately deflecting each of the plural electron beams to a dynamically-moving common point at the shadow mask, assure that each beam excites its respective color phosphor pixels and, therefore, provide proper color registration in the resulting image. And the deflection coils—particularly though not exclusively the horizontal sweep or deflection coils—must continuously move the electron beam(s) across the imaging screen at a constant linear velocity to avoid geometric distortion of the screen-generated images.

One of the major difficulties inherent in maintaining such image quality-affecting aspects as proper electron beam focus, convergence and sweep linearity is the constantly changing path length of the beam as it scans across the imaging screen. As is well understood by those skilled in the art the distance from the electron beam focusing lens elements to the imaging screen is constantly changing during operation of the tube and is significantly greater at the peripheral extremes of the screen than at its center. This dynamically-changing path length requires constant adjustment of, for example, the focal length of the beam(s), the convergence bias on the beams in a color tube, and the linear velocity of the vertical and, in particular, of the horizontal deflection sweeps. Although it is known, for this purpose, to apply time-varying correction voltages to these components of a CRT, such adjustments are typically based on the calculated, anticipated positions of the scanning beam—derived for example as a function of time and set, once, at the time of manufacture or initial tube alignment—rather than on the sensed, actual position of the beam as it sweeps across the imaging screen. Moreover, such currently practiced adjustments—sometimes referred to as digital dynamic focus and convergence—provide only gross corrections over relatively large areal zones, as for example defined by a 16 by 16 matrix over the entire imaging screen. Neither do heretofore known arrangements provide compensation for the effects of component aging or the like, or for more than relatively small deviations in focus and convergence, other than through the ability to effect periodic manual adjustments which, typically, must be performed by skilled service personnel. And no currently known CRT imaging systems of this type can or do provide closed loop, real time correction of focus, or convergence, or beam sweep linearity, or any other parameters that affect the quality or clarity of images produced on the imaging screen of the tube.

OBJECTS OF THE INVENTION

It is accordingly the desideratum of the invention to provide apparatus and methods for developing a time-varying signal as an electron beam sweeps across the imaging screen of a cathode ray tube, which signal may be applied to at least one beam or image-affecting element of the tube for improving the quality of an image operatively produced on the screen. It is a particular object of the invention to provide apparatus and methods for developing such a time-varying signal within and for applying the signal to elements of a substantially conventional cathode ray tube. It is a further object of the invention to provide apparatus and methods for developing such a time-varying signal and for using the signal to substantially eliminate geometric distortion of images produced on the tube screen. It is another object of the invention to provide apparatus and methods for developing such a time-varying signal and for using the signal to dynamically correct misfocusing of the electron beam on the imaging screen of the tube.

A further object of the invention is to provide apparatus and methods for developing such a time-varying signal and for using the signal to dynamically correct and improve the accuracy of beam convergence in a plural beam cathode ray tube.

Still another object of the invention is to provide apparatus and methods for developing such a time-varying signal and for using the signal to continuously determine the actual position of the electron beam as the beam is swept along and about the imaging screen of the tube.

Yet a further object of the invention is to provide apparatus and methods for developing such a time-varying signal and for using the signal to eliminate currently conventional overscanning of the imaging screen wherein peripheral portions of the video image information are lost to the viewer of the tube screen.

Another object of the invention is to provide apparatus and methods for developing such a time-varying signal in a single beam, monochrome cathode ray imaging tube.

These and other objects and features of the present invention will become apparent from the following detailed description considered in connection with the accompanying drawings. It is to be understood, however, that the drawings are designed solely for purposes of illustration and not as a definition of the limits of the invention, for which referecne should be made to the appended claims.

BRIEF DESCRIPTION OF THE DRAWING

In the drawing, wherein similar reference characters denote similar elements throughout the several views:

FIG. 1 is a cross-sectional, diagrammatic view of a single-gun, plural-beam-type color television cathode ray tube in accordance with the present invention;

FIG. 2 is a cross-sectional, diagrammatic, partial view of a modification of the tube of FIG. 1 in accordance with the invention;

FIG. 4 is another schematic block diagram circuit in accordance with the invention;

FIG. 5 is an elevated perspective view of a monochrome cathode ray tube imaging screen modified in accordance with the invention;

FIG. 6 is a schematic circuit diagram of an arrangement for increasing cathode ray tube imaging resolution;

FIG. 7 graphically depicts various signal waveforms associated with the circuit arrangement of FIG. 6; and FIG. 8 is a schematic, generally diagramatic, arrangement for improving horizontal linearity in a cathode ray tube while concurrently improving imaging resolution.

DETAILED DESCRIPTION OF THE PREFERRED EMBODIMENTS

Figure 3:
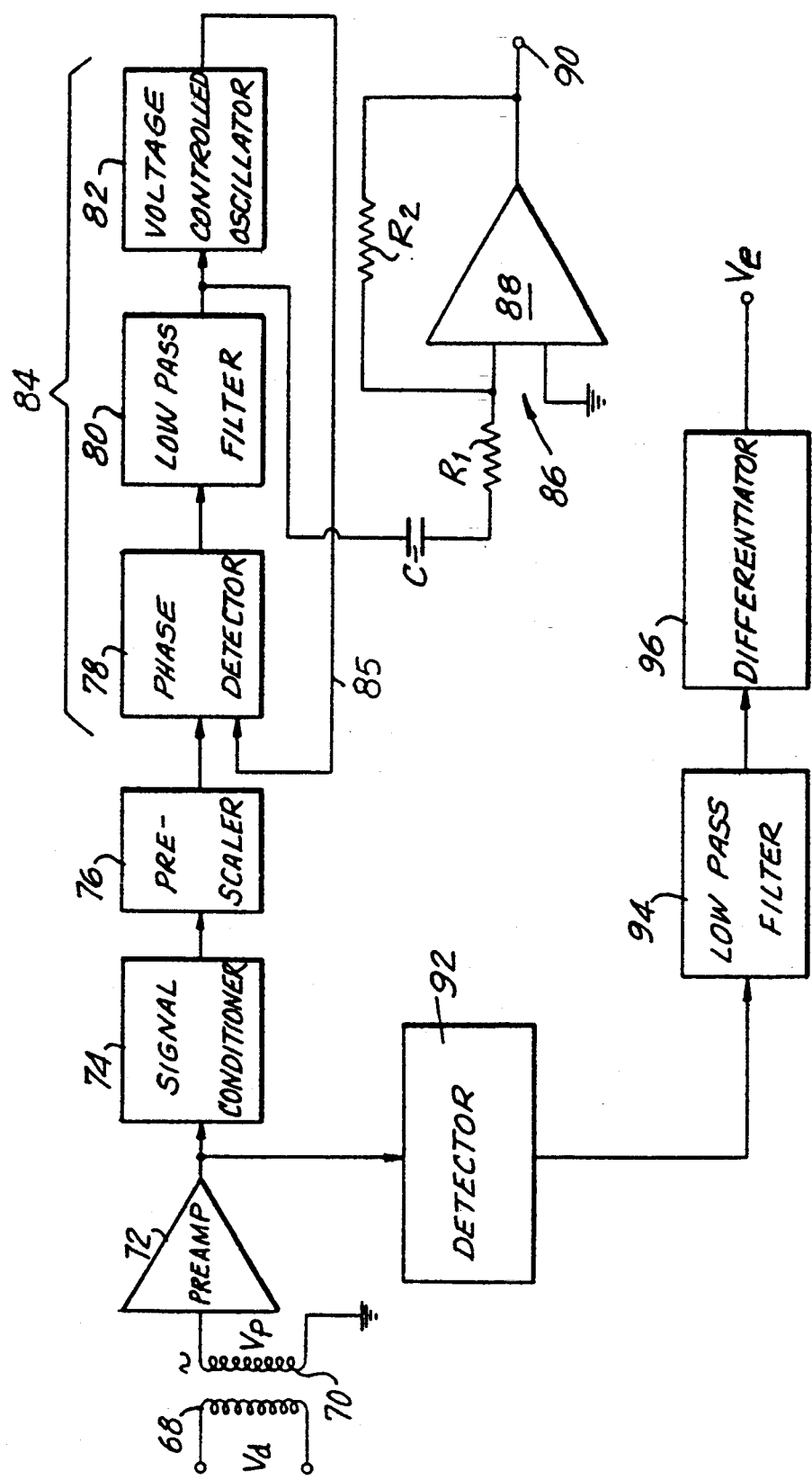
FIG. 3 is a schematic, generally block diagram circuit in accordance with the invention.

The present invention provides methods and apparatus for improving the quality of images produced on tire imaging screen of a cathode ray tube (CRT) such as is commonly used in television receivers, computer monitors and other imaging devices. For purposes of illustration, the invention is herein disclosed, and various preferred embodiments thereof are described, in conjunction with a single-gun, plural-beam-type color television tube. In such single-gun color tubes, three electron beams representing different color signals are formed and directed along separate paths by a common lens, following which two of the beams diverge, are subsequently reconverged at a common point at a beam-selecting grid or mask and then diverge again to impinge on the respective color phosphors which together represent a color picture element on the imaging screen. Nevertheless, those skilled in the art will readily appreciate that the methods and apparatus of, and the concepts underlying, the present invention are equally applicable to other color-imaging systems and, in particular, to cathode ray tubes of alternate configurations such, for example, as so-called delta-type tubes and multi-gun in-line tubes, the required modifications for these and other alternate applications being well within the mechanical skill of the ordinary practitioner. Indeed, as hereinafter disclosed the invention may also be applied to suitably modified single-beam monochrome cathode ray tubes to enhance the quality of monochrome images generated on the tube screen. All such modifications and alternate applications are within tire intended scope and contemplation of the invention.

Reference is now made to FIG. 1 which semi-schematically depicts a single-gun, plural-beam-type color television cathode ray tube 10 of generally conventional construction but incorporating a modification, hereinafter described, in accordance with the improvement of the present invention. An envelope 12 of glass or other electrically nonconductive material encloses a plurality of operating components of the CRT including an electron gun 14 for generating "red", "green" and "blue" signal electron beams 16, 18, 20 respectively which are directed toward a target or imaging screen 22 typically coated with color phosphors or the like as is well known in the art. Screen 22 is for example comprised of a successive arrangement of sets of "red", "green" and "blue" phosphor stripes or, in some tube constructions, dots, each of these sets constituting a color picture element on the imaging screen.

Gun 14 includes a cathode 23 having electron beam generating sources 24, 26, 28 and a first control grid 29 formed of separate grid members 30, 32, 34 for the respective beams 16, 18, 20. Grid members 30, 32, 34 are supported in slightly spaced, opposed relationship with the electron-emitting end surface of the cathode 23. The first control grid 29 performs the intensity modulation function and therefore has a signal voltage applied thereto. Thus, the "red", "green" and "blue" video signals are applied between the cathode 23 and the first control grid members 30, 32, 34 to modulate the respective beams 16, 18, 20 emanating from the cathode. A second, common control grid 36 is disposed in slightly spaced, opposed relationship with first grid members 30, 32, 34, and both the first and second control grids have respectively aligned apertures defined therein which sere the conventional beam-forming function in the normal operation of the tube 10. The final operating elements of the electron gun 14 are a sequential series of axially arranged, open-ended tubular grids or electrodes 38, 40, 42 which collectively define an electrostatic lens 44 for selective focusing of the beams 16, 18, 20.

By applying appropriate voltages to the first and second control grids 29, 36 and to the electrodes 38, 40, 42, electron lens fields are formed whereby the beams 16, 18, 20 generated at cathode 23 are selectively directed through the control grid apertures and the focusing electrodes toward the phosphor-coated imaging screen 22. The second control grid 36 and first electrode 38 cooperate to form a relatively weak auxiliary lens 46 by which the initially substantially parallel beams are made to converge at the optical center of a main lens 48 formed by the voltage distribution across the electrodes 38, 40, 42. Main lens 48 further serves to focus the plural electron beams 16, 18, 20 upon the imaging screen 22 on the faceplate of the tube 10. Typical voltage ranges for the various elements of the electron gun 14 are indicated, each with reference to the cathode voltage, in FIG. 1. By way of example, at one instant of tube operation the bias voltages applied to cathode 23, to control grids 29 and 36 and to focusing electrodes 38, 40, 42 may be 100 volts, 0 volts, 300 volts, 20 kilovolts, 200 volts and 20 kilovolts, respectively.

After the plural beams 16, 18, 20 leave main lens 48, the center beam 18 continues in a straight line coincident with the optical axis of the lens. The beams 16, 20, on the other hand, diverge away from the center beam 18. Accordingly, a convergence deflection assembly 50 is provided for the purpose of converging the outer beams to intersect with the center beam at a common spot so that all three beams pass through the same aperture of a beam-selecting screen grid or mask 52. Thereafter, the beams 16, 20 again diverge from the mask so that the "red" signal beam 16 goes on to strike the "red" phosphor stripe, the "green" signal beam 18 goes on to strike the "green" phosphor stripe, and the "blue" signal beam 20 goes on to strike the "blue" phosphor stripe of a common picture element on imaging screen 22. With accurate convergence of the electron beams 16, 18, 20, the combination of the three beams—intensity modulated by the respective "red", "green" and "blue" video signals—striking their respective phosphor stripes of a common picture element creates a portion of an image having proper registration and the appropriate color value.

Convergence assembly 50 is formed of a pair of shielding electrodes or plates 54, 56 disposed in spaced, opposed relationship about the optical axis of lens 48, and a pair of beam-converging deflector plates or electrodes 58, 60 supported in diametrically outwardly spaced, respectively opposed relation to the outer surfaces of shielding plates 54, 56. A voltage equal to the voltage applied to the electrodes 38, 42, generally at or near the anode potential of the tube 10, is applied to the shielding plates 54, 56, and a voltage which is lower by, for example, approximately 200 to 300 volts than the potential on the shielding plates is applied to the deflection plates 58, 60. Thus, a voltage difference or beam-deflecting potential $V_c$ is applied between each of the plates 54, 58 and the plates 56, 60.

The shielding and deflector plates of the convergence assembly 50 are positioned within the tube envelope 12 so that the center or "green" signal beam passes between the inner shielding plates 54, 56 and the outer or "red" and "blue" signal beams 16, 20 pass between the opposed plates 56, 60 and 54, 58, respectively. Since the shielding plates 54, 56 are at the same potential, electron beam 18 is not deflected as it passes therebetween. The existence of the deflecting voltage $V_c$ whereby the inner shielding plates 54, 56 are maintained at a higher potential than either of the outer plates 58, 60 does, however, function to inwardly deflect the electron beam 16 as it passes between plates 56, 60 and to inwardly deflect the electron beam 20 as it passes between the plates 54, 58. The potential difference $V_c$ thus imparts the requisite deflecting action to the outer electron beams 16, 20 whereupon, by appropriate selection of the voltage $V_c$, the electron beams may be directed in the depicted converging manner to impinge on a single picture element on the color phosphor imaging screen 22.

In the operation of the tube 10, the beams 16, 18, 20 are swept horizontally and vertically across the screen 22 to produce the usual cathode ray tube raster. In FIG. 1, the beams are continuously swept from one extremity of the imaging screen to the other. The horizontal and vertical deflections of the beams necessary to produce the picture raster are typically, as is well understood, electromagnetically accomplished by the application of time-varying potentials to conventional sweep deflection coils or yokes 62 generally mounted about the exterior neck of the tube envelope 12 between the convergence assembly 50 and the screen grid 52.

The screen grid or mask 52 is fixedly supported within the tube envelope 12 between the convergence assembly 50 and the imaging screen 22 in closely proximate, confrontingly spaced relation to the imaging screen and, therefore, in the path of the sweeping or scanning electron beams. The screen grid includes a plurality of apertures defined therethrough aligned with corresponding picture elements on the imaging screen 22. The placement of these apertures is intended to assure—with proper alignment of the electron gun 14, the screen grid 52 and the imaging screen 22, and with accurate convergence of the plural beams 16, 18, 20—that each electron beam will land only on its respective vertical phosphor strip on the imaging screen. The shape of the screen grid apertures varies for different tube types and configurations and may, by way of example, be cross-sectionally circular or form elongated slots. In single-gun, plural-beam-type CRT's such as the tube 10 illustrated in FIG. 1 the screen grid comprises a plurality of vertically-disposed strips or wires 64 defining vertically-disposed slots 66 therebetween. The improvement of the present invention is effective, however, without regard to the particular construction of the screen grid or the shape or form of its beam-selecting apertures. In this disclosure, therefore, the terms "screen grid" and "aperture grid", which are used for convenience and by way of example, should be understood as including these and all other alternate configurations and constructions of the beam-selecting grid or mask and are fully intended to be interpreted in a broad rather than a limiting sense.

Thus, as the scanning electron beams 16, 18, 20 are continuously swept across the screen grid 52 they pass through successive screen grid apertures 66 to impinge and thereby create an image on the imaging screen 22 by selective, modulated excitation of the color phosphors on the imaging screen. In sweeping across grid 52 the beams are at least partly intercepted by the screen grid strips or wires 64 and are thereby at least partly prevented from impinging on the imaging screen 22 by the strips or wires 64 intermediate successive grid apertures 66. In practice, this is true even if the beams are turned off or blanked between the plural scanned locations corresponding to the beam-selecting screen grid apertures.

The color-imaging cathode ray tube 10 as thus far described is substantially conventional. In accordance with the present invention, a sensing means or device—preferably a current sensing means—is connected between the aperture grid 52 and imaging screen 22 and the screen is, in turn, connected to the high voltage source or anode potential of the tube. As a consequence, any electrons that hit or impinge on the grid wires 64 as the beams are swept across the imaging screen will return to the high voltage supply through the current sensing device. In one currently preferred embodiment of the invention illustrated in FIG. 1, the current sensing device comprises a coil 68 although those skilled in the art will readily appreciate that numerous alternate implementations thereof may be employed. The use of a coil, however, provides certain noteworthy advantages.

In a particularly preferred form of this embodiment of the invention, coil 68 may comprise a so-called pot-core transformer wherein the coil is wound in and about a typically annular core of ferrite material or the like.

Such coils are advantageously self-shielding and are therefore especially effective in implementing the methods and apparatus of the invention without undue interference from the substantial magnetic fields normally present and operatively generated within the tube 10. Coil 68 is preferably supported or otherwise disposed closely proximate the interior surface of the tube envelope 12 and may, for example, be adhesively secured or otherwise affixed directly to the interior envelope wall at a location between the sweep coils 62 and the aperture grid 52.

As the electron beams 16, 18, 20 are operatively swept across the grid 52 and the imaging screen 22 a time-varying, substantially periodic current flow $I_d$ is induced through the current sensing coil 68 as electrons striking the aperture grid are returned to the high voltage source through the coil. This time-varying current results in a correspondingly time-varying voltage differential $V_d$ across the coil. Voltage $V_d$ (and, similarly, the currrent $I_d$) has the general form of a somewhat truncated sine wave which varies between a minimum voltage $V_{dmin}$ when the scanning electron beams successively pass through each of the screen grid apertures 66, and a maximum voltage $V_{dmax}$ as the swept beams are at least partly intercepted by the grid wires 64 intermediate successive apertures 66 whereby the electrons striking the grid wires are returned through coil 68 to the high voltage supply.

Those skilled in the art will appreciate that optimization of the quality of an image generated on the tube screen 22 requires minimized—and ideally no—interception of any part of the electron beams by the grid wires 64 as the beams successively pass through each screen grid aperture 66. For example, a misfocused beam passing through a screen grid aperture 66 will impinge on the immediately adjacent grid wires 64 to a greater extent than a properly focused beam. Similarly, misconvergence of the plural color tube beams at a grid aperture results in greater impingement of one or more of the beams on the adjacent grid wires than does accurately converged beams. These conditions of improved image quality may be attained by dynamically adjusting, for example, the focus and convergence of the beams so that the value of $V_d$ is minimized as the swept beams project through each screen grid aperture 68 to excite the phosphor stripes at a respective picture element location. This adjustment may also be defined as an effort to maximize the difference between the minimum voltage $V_{dmin}$ (as the beams successively pass through the grid apertures 66) and the maximum voltage $V_{dmax}$ (as the beams are swept between successive apertures and impinge on the grid wires 64).

In the FIG. 1 embodiment of the invention, the sensing means further comprises a pick-up coil 70—which may also, advantageously, be implemented with a pot-core transformer or the like—disposed proximate, preferably closely proximate or immediately adjacent, the exterior surface of the tube envelope 12 and, in any event, sufficiently proximate sensing coil 68 so that the time-varying current flow through and voltage $V_d$ across coil 68 electromagnetically induces a correspondingly time-varying current in and voltage $V_p$ across the pick-up coil 70. Sensing coil 68 is thus coupled to the pick-up coil, in the manner of the primary and secondary windings of a transformer, through the insulating and physically-separating glass wall of the tube envelope 12. In addition to advantageously electrically isolating the control signal $V_p$ from the time-varying signal $V_d$ and, more importantly, from the high voltages present within the tube, use of the FIG. 1 illustrated electromagnetically-coupled two-coil sensing arrangement enables preedetermined scaling of the relative magnitude of the control signal $V_p$ by appropriate selection of the winding or turns ratio of the coils 68, 70. Of course other, modified or substantially different arrangements for deriving or developing a control signal from the time-varying signal induced in a sensing means connecting the aperture grid 52 and imaging screen 22 may alternatively be employed within the scope and contemplation of the invention.

For example, FIG. 2 illustrates another currently preferred, alternate implementation of a current sensing device connecting the screen grid 52 and imaging screen 22 for developing the time-varying, periodic control signal $V_p$ as the beams are operatively swept across the grid. As there shown, the coil 68 of FIG. 1 may be replaced by a light emitting diode (LED) 100 connecting the grid 52 and screen 22. LED 100 is mounted in close proximity, preferably immediately adjacent, the inner wall face of the tube envelope 12, as for example in a substantially opaque housing 102 that shields it from extraneous light within the tube interior. As the electron beams 16, 18, 20 sweep across the aperture grid 52, the time-varying, periodic current generated through the LED causes it to illuminate in correspondingly time-varying proportion to such current. An optical sensor 104—such, for example, as a conventional phototransistor or the like—mounted closely proximate or adjacent the outer face of the tube envelope wall and positionally aligned with LED 100 detects and outputs a control signal $V_p$ substantially proportional to the sensed illumination of the LED. Optical sensor 104, therefore, takes the place of the pick-up coil 70 shown in FIG. 1 and, as with LED 100, may be enclosed within a substantially opaque housing 106 shielding the sensor from ambient light. In this arrangement the wall of the tube envelope 12 is preferably substantially clear or transparent or otherwise appropriately light transmissive in the immediate vicinity of the positionally aligned LED 100 and sensor 104 to provide a generally unimpeded light path for optically coupling the LED and sensor in electrically isolated relation through the envelope wall.

Those skilled in the art will recognize that the use of a light emitting diode to provide the current path between the aperture grid 52 and imaging screen 22 yields an additional benefit not available when the current sensing means is implemented with a one or two-coil arrangement as illustrated in FIG. 1. Derivation or generation of the signals $V_d$ across LED 100 and $V_p$ across optical sensor 104 does not require continuous movement of the electron beam and, consequently, in an implementation of the invention incorporating the FIG. 3 sensing means the signal $V_d$ and $V_p$ need not be time-varying or periodic. Thus, in such an arrangement, the focus and/or convergence of the beams, for example, may be adjusted based on the appropriately optimized difference between one of the signals $V_d$ or $V_p$ when the beams are projecting through an aperture in the screen grid (e.g. $V_{pmin}$) and when the beams are impinging on an adjacent aperture grid wire ($V_{pmax}$). Put another way, optimization of the beams and resulting screen image may be effected by positioning the beams at a screen grid aperture and then very slightly deflecting or "nudging" the beams to impinge on an adjacent grid wire. Such modifications are within the intended scope of the present invention.

Still other implementations of the current sensing device are also within the contemplation of the invention. Indeed, it should be understood that such alternate arrangements need not incorporate either insulated coupling across the tube envelope or internally-disposed sensor means connecting the aperture grid 52 and imaging screen 22—and in which time-varying current $I_d$ and/or voltage $V_d$ is generated—with exteriorly-disposed signal pick-up or processing elements or circuitry.

As should now be apparent, as the electron beams 16, 18, 20 are operatively swept across the aperture grid 52 to form all image on imaging screen 22, a time-varying signal directly related to the movement of the beams across the grid 52 is generated in the current sensing means 68 (or 100 in FIG. 2). This signal, and the resulting periodic, time-varying voltage $V_p$ induced across pick-up coil 70, is at a maximum as the beams sweep across each grid strip or wire 74 between successive grid apertures 66. Thus, the signal $V_p$ is periodic with a frequency proportional to, and which varies with, the linear scanning velocity of the electron beams as they are driven across the screen by the sweep drive or deflection coils 62. In accordance with another aspect of the present invention, a correction signal derived from the signal $V_p$ is fed to the sweep deflection coils 62 and, in a closed loop arrangement, is dynamically adjusted to maintain a constant frequency of the signal $V_p$. This adjustment results in substantially constant linear beam sweep velocity across the aperture grid and, therefore, in minimized geometric distortion and correspondingly improved quality of the images produced on the imaging screen 22.

FIG. 3 depicts, by way of example, a block diagram circuit arrangement for utilizing the control signal $V_p$ derived from the current sensing means connecting the aperture grid 52 and imaging screen 22 for improving the quality of an image produced on the tube screen in accordance with various aspects of the present invention. It should at the outset be noted, and those skill in the art will recognize in reviewing the present disclosure, that the various individual elements diagramatically illustrated in the block diagram of FIG. 3 are conventional and readily available and, therefore, require neither further description herein nor undue experimentation to enable practice of the present invention. In any event, the time-varying, periodic, sine wave-like signal $V_p$ from pick-up coil 70 is initially applied to a preamplifier 72. Preamp 72 buffers the control signal and is effective to reduce the level of noise present in the signal. The signal output from the preamp is, in the FIG. 3 illustrated arrangement, then directed to separate (i.e. upper and lower in the Figure) circuit portions for effecting dynamic adjustment of various CRT operating voltages and elements in accordance with different aspects of the invention—all, however, relating to the quality of images produced on the tube screen 22. The first or upper portion of FIG. 3 processes the signal $V_p$ for use in providing a correction signal for specific application to the horizontal sweep drive circuits and coils 62. Similar correction signals may also be derived from the signal $V_p$ and applied to the vertical sweep drive circuits and coils for improving the vertical linearity of images produced on the imaging screen 22.

Referring now to the upper portion of FIG. 3, the output of preamp 72 feeds a conditioning circuit 74 wherein the waveform of the periodic signal is squared to facilitate wave detection and further processing as will hereinafter be described. The frequency of the signal $V_p$, and thus of the squared periodic waveform output from signal conditioner 74, is relatively high—typically, in color television cathode ray tubes for example, in the range of about 100 to 200 megahertz. For convenience in subsequent processing of the signal and to enable the ready use of conventional, relatively inexpensive off-the-shelf components and integrated circuits, the signal from conditioner 74 may be prescaled at 76 to lower its frequency to, for example, the range of approximately 1 to 5 megahertz. Although such prescaling results in a slight loss of operating sensitivity in dynamically correcting horizontal deflection of the electron beams and, therefore, in stabilizing the horizontal linearity of images generated on the screen 22, these losses are relatively minimal and thus well within acceptable limits so as to be virtually unnoticeable to a viewer of the resulting video images. Nevertheless, alternate circuit arrangements may be substituted for the frequency prescaler 76 such, for example, as means for heterodyning of the signal output from conditioner 74 to provide substantially increased sensitivity in the dynamic adjustment of horizontal beam deflection in accordance with the invention.

The output of frequency prescaler 76 is directed to a phase detector 78 which, in conjunction with a following series-connected low pass filter 80 and voltage controlled oscillator (VCO) 82, forms a phase locked loop or frequency discriminator 84. The output of VCO 82 is reapplied to phase detector 78 by return loop 84. As should be apparent, filter 80 outputs a net DC voltage for input to VCO 82, and variations in the frequency of the signal $V_p$ and therefore in the signal input to the phase locked loop 84 result in corresponding changes to the voltage applied to the VCO.

The output of low pass filter 80 is applied to a differentiator 86 substantially conventionally formed of an operational amplifier 88, resistor $R_2$, and a capacitor C and resistor $R_1$ in series connection between the op amp 88 and filter 80. The series combination of resistor $R_1$ and capacitor C, as is well understood, sets the upper limit pole (at $R_1/C$) for the gain of op amp 88. Differentiator 86 outputs, at terminal 90, a control signal or voltage intended for application as a second order correction to the conventional operating circuitry for the horizontal sweep drive coils 62. Thus, differentiator 86 closes the control loop; the phase locked loop 84 stabilizes the frequency of the signal $V_p$ by dynamically adjusting the correction signal applied to the horizontal deflection coils 62, thereby operating to maintain a substantially constant horizontal scan rate of the electron beams 16, 18, 20. Thus, in accordance with the invention, an error signal proportional to the beam velocity across the imaging screen is developed and is utilized to enhance the image quality by significantly improving at least the horizontal linearity of images produced on the tube screen 22. Indeed, the present invention provides the ability to realize an unusually high degree of horizontal linearity not heretofore readily attainable since any variations in horizontal beam sweep velocity can be corrected and thereby substantially eliminated. This adjustment may be carried out on a continuous, ongoing basis whenever the tube 10 is in use for generating images on its imaging screen 22.

The second, lower-illustrated portion of the block diagram of FIG. 3 generates a correction signal for specific application to the beam focusing and/or convergence deflection circuitry of the tube 10. The buffered output of preamplifier 72 is applied to a detector 92, implemented for example by a diode rectifier for converting the substantially sinusoidal waveform emerging from pick-up coil 70 and preamp 72 to a time-varying net DC voltage. That DC voltage output is low pass filtered at 94, thus substantially attenuating high frequency noise or ripple present in the preamplified and rectified signal. In the embodiment of FIG. 3, filter 94 is preferably at least a 3 or 4 pole filter having a corner or cut-off frequency at approximately one-fifth the frequency of the control signal $V_p$ developed from the current sensor connecting the aperture grid 52 and imaging screen 22. The signal output by low pass filter 94, representing the average amplitude of the control signal waveform $V_p$, is then applied to a differentiator 96. Differentiator 96 generates an error signal $V_c$ for application as a second order correction to the conventional focus and/or convergence control circuitry of the tube 10 and associated television receiver or the like, thereby closing the feedback loop by which the voltage differential $V_{dmax} - V_{dmin}$ is dynamically maximized, resulting in corrected focus and/or convergence and correspondingly improved image quality on screen 22.

Use of the focus and/or convergence correcting aspects of the present invention may be effected in a variety of ways. It is currently contemplated that each time the television receiver, or other apparatus incorporating the cathode ray tube 10, is powered up or initialized, the entire imaging screen 22 be mapped to develop, in accordance with the invention, a set of second order correction voltages for application to the focus and/or convergence circuitry, as appropriate, for improving image quality. For example, at initialization each of the beams 16, 18, 20 might first be separately swept across the entirety of the aperture grid to map and store a set of focus correction voltages for application to the control circuitry of electrostatic lens 44 during normal imaging operation of the tube 10. Then, with these focus correction voltages applied to the lens focusing circuitry to provide enhanced beam focus, all of the electron beams 16, 18, 20 may be concurrently swept across the entirety of the aperture grid to map and store a complete set of convergence correction voltages for application, during normal imaging operation of the cathode ray tube, to the control circuitry of the convergence plates 58, 60. If desired or deemed appropriate, one or several such complete raster scans for initializing the focus and convergence correction voltage maps may be performed at tube power-up and, similarly, this process may be carried out for focus alone or for convergence alone as a matter of design choice. The resulting increased accuracy of beam focus and/or convergence, and the corresponding enhancement of image quality on the tube screen 22, provides inherently superior improvements in image quality over current focus and convergence correction arrangements which are typically set once at the time of tube manufacture or initial alignment and do not provide automated regular or continuous adjustments of focus and/or convergence.

It is also contemplated that the mapping of the imaging screen to generate the second-order focus and/or convergence correction voltages be performed on a substantially periodic or at least a repetitive basis—in addition to at tube power-up—throughout periods of tube operation. The convergence adjustment, for example, may advantageously be carried out continuously, or at least periodically, all the while that operating power is applied to the tube 10. This continuous adjustment is possible because the process of generating the convergence correction voltages has no deleterious effect on images produced on the imaging screen and is thus transparent to a viewer of the television receiver or other tube-incorporating device. Focus adjustments or updating of the initialized focus correction map, on the other hand, which may most readily be performed by individually sweeping each of the electron beams about the aperture grid, could accordingly be carried out whenever, by way of example, appropriate sensing circuitry detects image generation involving only a single one of the beams, or during sensed program content screen blanking, or during channel changing or other circumstances wherein screen imaging is either not intended or required.

As should by now be apparent, the present invention is broadly grounded on the novel derivation of a time-varying control signal waveform from a sensing means, preferably a current sensing means, connecting the imaging screen of a cathode ray tube and an aperture or screen grid or mask disposed closely proximate the imaging screen, and the development from the derived control signal of a correction signal advantageously capable of use in a wide variety of ways for improving the quality of images generated on the imaging screen. The specific applications to which these control and correction signals may be put in accordance with the invention—only several of which are, by way of example, expressly described herein—are obviously many and varied. For example, as heretofore disclosed the time-varying, sine wave-like like control signal has a frequency proportional to the swept beam velocity across and about the aperture grid and imaging screen and may therefore be applied to the horizontal and/or vertical deflection coil circuitry to stabilize image linearity and thereby substantially eliminate geometric distortion of images on the tube screen. Also hereinabove described is use of the control signal to correct either or both focus and convergence of the plural electron beams of a color cathode ray imaging tube, thereby substantially improving the definition or clarity and color reproduction and registration accuracy of images produced on the tube screen. Numerous additional applications will suggest themselves to those skilled in the art having knowledge of this disclosure.

One such further application is depicted in the block diagram of FIG. 4 in which the various illustrated circuit elements are all of conventional and readily available construction. Here again using, for convenience of explanation, the two-coil sensing means arrangement of FIG. 1, the periodic, sine wave-like signal $V_p$ is applied to a preamplifier 108 and then to a signal conditioner 110 wherein the waveform is squared for subsequent processing. The resulting square wave is fed to the clock or counting input of a counter circuit 112 which may, for example, provide a binary or binary-coded decimal count at its ouput terminals 114. The counter 112 is reset to zero by applying a pulse to its reset terminal 116 with each horizontal retrace—i.e. at each vertical indexing or flyback—of the beams, and of course at tube initialization or power-up. Since the periodic signal $V_p$ goes "high" each time the electron beams sweep across an aperture grid wire 64 and goes "low" between successive or adjacent wires as the scanning beams project through each grid aperture to impinge on the tube screen 22, for each horizontal sweep of the electron beams the output of counter 112 will correspond to the number of aperture grid wires crossed by the scanning beams. And because the existing number of aperture grid wires 64 is known for a given cathode ray tube 10, the output of counter 112 directly provides a number indicating the exact current, absolute horizontal position of the beams along the grid 52 and, correspondingly, on the imaging screen 22. Vertical beam position is similarly provided by supplying each flyback or retrace pulse fed to counter reset terminal 116 to the clock input of a second counter 118, the outputs 120 of which yield a number correspondingly indicative of the exact current, absolute vertical beam position on the screen. Counter 118 is reset each time the beams are returned to the top of the screen to initiate a new raster scan.

The ability to immediately and continuously identify with exceptional accuracy the exact position of the scanning electron beams about the imaging screen is of substantial value in enabling further enhancement and improvements in image quality. With this information, correction signals may be developed and applied to the beam focusing and beam convergence circuitry of the tube to accurately compensate for the substantial variations in path length that are inherent in cathode ray imaging tubes as the electron beams are swept horizontally and vertically about the screen. Moreover, the aforementioned map of second-order correction voltages for adjusting the focus and convergence of the scanning beams, as hereabove described, developed at tube power-up and/or on a continual, ongoing basis may be applied or utilized with appreciably improved accuracy by reason of the availability of this additional information as to the exact instantaneous position of the beams. And the beam position information further enables greatly improved image reproduction on the screen since the need to overscan the edges of the imaging screen, as is presently conventionally practiced and by which the peripheral extremes of the image information transmitted from the video signal source are lost to the viewer of the tube screen, is eliminated by the availability of this exceptionally accurate information indicating scanning beam position.

This beam position information may also be advantageously utilized to significantly increase the attainable horizontal resolution of the cathode ray imaging tube. Current imaging display technology requires that the electron beam diameter be relatively large with respect to the size of the phosphor stripes or dots upon which the beam is intended to operatively impinge as it is swept across the screen. More particularly, as presently practiced the beam diameter is approximately 2.3 to 2.7 times the triad pitch—i.e. the center-to-center spacing of adjacent red-green-blue phosphor imaging locations or, correspondingly, of adjacent mask apertures or slots. Such a notably enlarged diameter beam spot has been heretofore required because, as the beam is swept across the screen, it typically impinges on the mask as much as 80 percent of the time and on the imaging screen (through the mask apertures) only 20 percent of the time. Any reduction of the beam diameter would therefore substantially increase the probability of video signal information loss as the continuously swept beam moves between successive mask aperture locations. Consequently, the use of an enlarged beam diameter assures continuity and imaging of all of the incoming video information but correspondingly degrades and prevents the attainment of higher imaging screen resolutions.

In accordance with the present invention, however, the waveform or signal derived from the current sensor connecting the aperture mask and imaging screen can be advantageously employed to enable a significant reduction in the diameter of the electron beam spot—down to substantially the diameter of the mask apertures, if desired—resulting in a corresponding significant increase in the attainable horizontal imaging resolution of the cathode ray tube. An arrangement for doing so is depicted, by way of example, in FIG. 6 and is identified by the general reference numeral 130.

The advantageous increase in resolution is achieved by summing or integrating the video information signal as the electron beam is swept between adjacently-disposed grid apertures and then impressing the summed video signal data onto the electron beam concurrent with its reaching and passing through the next aperture onto the imaging screen. In this manner, the contents of the video information signal while the beam impinges on the aperture grid is preserved until the beam reaches the next grid aperture through which the electron beam passes to strike the screen and excite the respective imaging phosphors. The beam spot diameter can accordingly be reduced to the aperture diameter substantially without loss of information content from the video signal. And the grid apertures, and phosphor triads, can then optionally be placed much closer together, further increasing the attainable image quality, definition and screen resolution. This procedure can only be successfully practiced, of course, with the availability of reliable information as to the actual position of the continuously moving beam—or, more particularly, as to when the beam reaches the location of each grid aperture. As should by now be apparent, the waveform derived from the current sensor connecting the aperture grid and imaging screen, in accordance with the invention, provides that information and therefore enables the advantageous reduction of imaging beam spot size.

FIG. 6 depicts one of three identical circuit arrangements 130 required to implement this aspect of the invention in a color cathode ray imaging tube—i.e. one for-driving each of the red, green and blue electron beams. As there shown, a pair of integrators are alternately switched, each in out-of-phase relation with the other, for first receiving the video signal and then outputting the integrator's contents to the electron gun or beam drive as the scanning beam reaches the next successive grid aperture. The switching is triggered by a pulse train or like timing information derived from the current sensor signal. Although the particular form of current sensor utilized for this purpose is generally a matter of design choice, the use of that embodiment of the current sensing arrangement illustrated in FIG. 1—employing electromagnetically-coupled sensor and pickup coils 68, 70—will be assumed for purposes of the following description.

Referring to FIG. 6, the analog video signal is directed to a routing switch 132 which alternately applies the signal to first and second integrators 134, 136 constructed about conventional operational amplifiers 138, 140, respectively. Of course, the integrators may alternatively be formed of any suitable components or elements operable for summing a continuous or substantially continuous input. The outputs (designated DATA-1 and DATA-2) of the integrators 134, 136 are fed to the alternately-selected sides of a selecting switch 142 from which the integrator outputs are alternately applied to the usual electron gun drive circuit 144 for the appropriate red, green or blue phosphor-exciting electron beam. Switches 132, 142 are ganged or otherwise concurrently operated in tandem but out-of-phase relation—i.e. so that when the routing switch directs the video signal to the input of the first integrator 134, the selecting switch connects the output of the second integrator 136 to the cathode ray tube electron gun drive 144, and vice versa. Each of the integrators also includes a respective single-pole switch 146, 148 across its feedback capacitor, which switch is open when the integrator is connected for receiving the incoming video signal and closed when the integrator output is connected to the electron gun drive 144. These switches 146, 148—by which each respective integrator is flushed of data when its input is not connected to the video signal source—are likewise operated in tandem with the routing and selecting switches 132, 142.

PIG. 7 graphically illustrates, in respective timed relation, various waveforms associated with the arrangement of FIG. 6. The waveform $V_p$ is the voltage waveform or signal induced across the pickup coil 70 (FIG. 1) by the time-varying current flow through current sensing coil 68 during normal imaging operation of the cathode ray tube. As previously pointed out, the potential minima in that waveform represent the passage of the moving electron beam through successive apertures in the shadow mask or grid. Schmidt triggering or like conditioning of the waveform $V_p$ squares the wave and yields the pulse train or derived clock waveform 150 wherein, again, the minima 152 correspond to those times during which the electron beam is moving across the locations of apertures in the grid. The analog video signal 154 is also graphically illustrated in FIG. 7.

The operation of the arrangement 130 of FIG. 6 should now be apparent. The switches 132, 142, 146, 148 are operated or switched in tandem at a rate driven by the derived clock waveform 150, the switching being effected as the swept electron beam reaches its successive grid aperture and, in the Figure, the waveform 150 goes low. Thus, with the various switches initially moved into the positions shown in FIG. 6, the video signal is applied by routing switch 132 to the first integrator 134 which integrates and stores the applied video signal. When the electron beam reaches the next aperture, all of the switches are operated in tandem whereby the output DATA-1 of the first integrator 134 is directed to the electron gun drive 144 and the second integrator 136 begins to receive the incoming video signal which it stores and, when the beam reaches the next grid aperture, outputs its stored signal DATA-2 to the gun drive 144. The integrator outputs DATA-1 and DATA-2 are graphically depicted in FIG. 7, with pairs of dotted vertical lines representing those times at which the electron beam is passing through the grid apertures. The DATA-1 and DATA-2 signal levels appearing within those dotted vertical line pairs in the Figure correspond to the summed video information that, in accordance with the invention, is imparted to the electron beam and correspondingly impressed on the imaging screen to excite the color phosphor stripes or dots as the beam passes through successive grid apertures. The video signal contents during those periods when the beam is crossing and impinging on the grid between adjacently-disposed apertures is thus preserved and imparted to the beam and imaging screen at the appropriate instants. This permits a significant reduction of the electron beam spot diameter from its currently-used enlarged size to the aperture diameter, by which increases in horizontal screen resolution and image quality are advantageously achieved.

Image quality on the tube screen can be further enhanced, in accordance with the invention, by combining the foregoing procedure for increasing resolution with precise correction of horizontal linearity. As earlier pointed out, conventional cathode ray imaging tubes exhibit varying degrees of horizontal image distortion caused by the appreciable variations in beam path length that are inherent in CRT's as the electron beams are swept horizontally and vertically about the screen. An arrangement for utilizing the beam position information derived from the current sensor connecting the aperture grid and imaging screen to substantially eliminate linearity-related image distortion, while concurrently notably increasing resolution as above-described, is illustrated by way of example in FIG. 8. As with FIG. 6, the FIG. 8 arrangement is one of three identical circuits utilized, respectively, for driving the red, green and blue electron beam-generating guns in a color cathode ray imaging tube in accordance with the present invention.

In the circuit 156 of FIG. 8, the analog video signal is first applied to a voltage-to-current converter 158 and, from there, to the input of each of a parallel pair of analog multistage shift registers implemented by conventional charge transfer devices (CTD-1 and CTD-2) 160, 162. As is well known, charge coupled or transfer devices—such, for example, as those manufactured by EG&G Reticon of Sunnyvale, Calif.—are also commonly referred to as analog delay lines or bucket brigade devices and, in this embodiment of the invention, each of CTD-1 and CTD-2 have the same number of stages or cells as the number $n_a$ of apertures or slots in each horizontal row of the CRT aperture grid or mask. The output of each charge transfer device 160, 162 is connected to a respective terminal of a data selecting switch 164, the commutator or wiper arm or the like of which directs the output of the switch-selected CTD to a current-to-voltage converter 166 and, finally, to the usual cathode ray tube electron gun drive 168 for impressing the imaging data on the scanning electron beam.

In further accordance with the invention, each of the charge transfer devices 160, 162 is clocked—to repeatedly shift or advance the received and stored data from stage-to-stage in the CTD—at one of two alternately-selected rates through respective switches 170, 172. The wiper arms or commutators of switches 170, 172, which are operated in out-of-phase relation and in tandem with each other, as well as in tandem with the data selecting switch 164, alternately connect the clock input of each CTD 160, 162 to a first pulse train at frequency $f_k$ and to a second pulse train at frequency $f_p$. While CTD-1 is clocked at $f_k$, CTD-2 is clocked at $f_p$, and vice versa. Frequency $f_k$ is a generally constant pulse rate defined by the product of $n_a$ (the number of apertures in each horizontal row of the CRT aperture grid) and the CRT horizontal retrace frequency; the frequency $f_p$ is defined by the pulse train 150 (FIG. 7) derived from the current sensor connecting the aperture mask and imaging screen and, therefore, varies as the electron beam is swept across the tube and the beam path length continuously changes.

In operation, the varying-voltage defined video signal is converted at 158 to a correspondingly current-varying signal and applied to each of CTD-1 and CTD-2. It is assumed, for purposes of description, that the tube has just been turned on or activated and the horizontal retrace pulse has just caused the wipers of the switches 164, 170, 172 to have been moved to the positions shown in FIG. 8. Thus, CTD-1 is now clocked at $f_k$, and CTD-2 at $f_p$. The first stage of each charge transfer device 160, 162 receives and stores the incoming current-varying video signal and continues to receive and store the signal until the next clock pulse is applied to its clock input terminal. As a practical matter, by reason of the analog nature of charge transfer devices the signal data stored in the first stage of each CTD is the sum of the video signal level applied to its input during the period from one clock pulse to the next—i.e. the integral of the converted current-varying video signal between successive clock pulses. Thus, the use of charge transfer devices in the circuit arrangement of FIG. 8 advantageously provides—in addition to precise horizontal linearity—the integration of the video signal employed, as in the circuit 130 of FIG. 6, to increase screen resolution by enabling reduction of the electron beam spot diameter.

With the second clock pulse, the data in the first stage of each CTD is shifted to the second stage of the respective CTD and the first stage begins to receive and store the next portion of the video signal data until the following clock pulse when the data in the first and second stages is shifted to the second and third stages, respectively, and so on with each succeeding clock pulse. This process continues for a total of $n_a$ clock pulses—corresponding to the number of apertures defined horizontally across the aperture grid—until the next horizontal retrace pulse triggers the return of the electron beam to the opposite edge of the screen (and aperture grid) and the wipers of switches 164, 170, 172 are moved to their positions opposite those shown in FIG. 8. Thus, CTD-1 will then be clocked at $f_p$, CTD-2 at $f_k$, and the new position of switch 164 connects the output of CTD-1 (in place of CTD-2 as before) to the current-to-voltage converter 166 and electron gun drive 168.

During what would otherwise be this first horizontal scan of the electron beam, the gun drive 168 receives, through switch 164, the serially-shifted contents of CTD-2. However, when the tube is first actuated or turned on the device CTD-2 contains no valid video signal dam. It is accordingly preferred that the electron beams be blanked or disabled or otherwise receive other tube initializaion data for at least the first horizontal scan of the beam and/or that, at tube initialization, at least the charge transfer device 162 be for example loaded with a stream of $n_a$ zeros or equivalent. Appropriate apparatus and procedures for this purpose will be apparent to those skilled in the art.

At this point, device CTD-1 contains all of the information content of the video signal received during what would otherwise have been the entire first horizontal trace or scan of the beam. That information is, however, sliced or broken up into $n_a$ uniform pieces or segments—uniform in the sense that, because CTD-1 was clocked at the constant frequency $f_k$, each and every stored dam segment in each of the respective stages or registers of CTD-1 was received during an equal time interval or period. Put another way, the video information signal has been divided or segmented, at a constant rate or frequency, into $n_a$ pieces and stored in the $n_a$ stages of charge transfer device CTD-1.

During the next horizontal trace period of the electron beam, charge transfer device CTD-2, clocked at the constant frequency $f_k$, similarly receives and stores the incoming video signal in $n_a$ uniform slices or segments in its $n_a$ stages. At the same time, device CTD-1, now clocked at the nonconstant rate $f_p$, also receives the incoming video signal but, as will become clear, the data thereby stored in CTD-1 is of no consequence to the operation of the arrangement 156. Nevertheless, since all $n_a$ stages of CTD-1 are already filled with the $n_a$ segments of the preceding horizontal scan period of video signal data, each succeeding clock pulse to CTD-1 causes the stored data to be shifted, stage by stage in first-in-first-out relation, out of the charge transfer device from which it is directed by switch 164 to converter 166 and gun drive 168. Drive 168 impresses the received data on the electron beam for imaging on the tube screen as the beam sweeps across the aperture grid and screen. And because the stored video data segments are output from the charge transfer device by the current sensor-derived clock signal 150 at variable frequency $f_p$, the stored data segments are output at the precise instants required to assure that all of the video data passes through the grid apertures and thus reaches the imaging screen. This process continues for $n_a$ clock pulses, at which time the next horizontal retrace pulse triggers the return of the beam to the opposite side of the imaging screen, the wipers of the switches 164, 170, 172 return to their FIG. 8 illustrated positions, and the segmented incoming video signal data received during the last horizontal beam trace and stored in the $n_a$ stages of charge transfer device CTD-2 is serially output at $f_p$ through switch 164 to the electron gun drive 168 through current-to-voltage converter 166.

Thus, in accordance with this aspect of the invention, the information content of the video signal during consecutive time intervals defined by succeeding horizontal retrace pulses is integrated and stored alternately in one, and then in the other, charge transfer device 160, 162, in $n_a$ segments, at the uniform rate or frequency $f_k$, and is then output from the respective CTD during the interval defined by the following pair of retrace pulses to the electron beam at the nonuniform or varying rate $f_p$. Since the waveform 150 (FIG. 7) which defines $f_p$ is derived from the current sensor connecting the tube grid and screen, the uniformly segmented video dam is output from each charge transfer device and directed to the imaging screen at a nonuniform rate—namely, in substantially perfect synchronization with the passage of the electron beam over and through the grid apertures. In this manner, compensation is provided for the constant variations in scanning beam path length whereby stable and precise horizontal linearity is assured. At the same time, by reason of the advantageous use of charge transfer devices the information content of the video signal as the beam passes between successive grid apertures and thus impinges on the grid is preserved so that the beam diameter may be reduced to the aperture diameter and imaging screen resolution greatly increased.

As should now be apparent, although the current-varying video signal from converter 158 is, in the disclosed circuit arrangement 156 of FIG. 8, at all times applied to the inputs of both the charge transfer devices 160, 162, the data stored in that CTD whose output is at that time directed to the gun drive 168 by switch 164 is of no particular use or consequence since, by the time that this newly stored data reaches the CTD output, the switch 164 will have been operated to direct stored data from the other CTD to the electron gun drive. Accordingly, if desired an additional switch (not shown), operated in tandem with the switch 164, may optionally be inserted between the incoming video signal and the charge transfer devices 160, 162 for alternately applying the video signal to only one, and then to the other, charge transfer device.

It should be further understood that the FIG. 8 illustrated arrangement is subject to numerous modifications as matters of design choice. For example, separate voltage-to-current converters, and/or current-to-voltage converters, may alternatively be associated with each CTD 160, 162. In another modification, the combination of the sample-integrating circuit arrangement 130 of FIG. 6 and a series-connected voltage-to-current converter may be employed as a front-end to each of the charge transfer devices 160, 162 of FIG. 8—or to some alternate data storage devices—for applying integrated data signal samples to each CTD or other data storage device. Moreover, switches 164, 170, 172 may be implemented by any apparatus or equivalent devices or elements and, indeed, it is preferred that their functionality be provided through non-mechanical, e.g. electronic, means for achieving the required switching operations at high speed and with precisely controllable timing. In addition, each charge transfer device may be formed, rather than of $n_a$ stages or cells, of an integer multiple of $n_a$ cells so that the segmented and stored video signal is output from the CTD to the electron gun drive with a delay of an integer number, more than one, of horizontal beam sweeps. Still further, the use of charge transfer devices for forming the shift and storage registers of this aspect of the invention is likewise herein disclosed by way of example only and, although operatively advantageous, is not critical to its successful implementation. Thus, other data shifting and storage arrangements, of either analog or digital nature, by which precise horizontal linearity is achieved are within the scope and contemplation of the invention—even where such alternate arrangement does not itself additionally provide summing or integration of the video signal segments for enabling reduction of the electron beam spot diameter and the resulting increase in imaging resolution. All such variations and modifications are within the intended scope and contemplation of the invention and may be readily implemented by those of ordinary skill in the art.

The various methods and apparatus of the invention have, as thus far disclosed, been described in association with and in relation to a plural-beam cathode ray tube such as is generally utilized for color imaging. However, in accordance with still another aspect of the invention virtually all of the contemplated and herein described methods and apparatus for enhancing and improving the display of images on a plural-beam tube screen may be employed for improving the display of monochrome images on the screen of a single-beam tube. Of course, in order to do so it is necessary to develop a periodic control signal which varies, generally in the manner of a sine wave-like waveform, as the beam is swept across the imaging screen of the tube and, for that purpose, the single-beam cathode ray tube must incorporate a modification such, for example, as that hereinafter described.

In disclosing the various aspects of the invention in conjunction with a plural-beam imaging tube the periodic control signal has been developed by sensing means connecting the beam-selecting aperture grid and the imaging screen of the tube. As is well known, however, the construction of single-beam monochrome imaging tubes primarily differs from that of plural beam color tubes by the omission of any means or apparatus for providing or adjusting the convergence of multiple beams. As a consequence, such monochrome tubes lack an aperture grid or the like disposed in close proximity to the imaging screen. In accordance with the present invention, therefore, all otherwise generally conventional single-beam cathode ray tube (not shown) is modified by locating a sensing grid, such as that identified by the reference numeral 122 in FIG. 5, in close proximity to the otherwise conventional imaging screen 124.

In a currently preferred construction, the sensing grid 122 is laid or deposited or otherwise disposed in directly supported relation on that surface of the imaging screen on which the electron beam impinges to generate viewable images. Conventional monochrome screens are typically formed by depositing a layer of imaging phosphor on the interior tube target surface and a metallized conductive layer, as of aluminum, atop the phosphor. In accordance with an embodiment of the present invention, the sensing grid 122 is defined by selectively depositing, on the aluminized target screen 124, a substantially transparent insulating material and, atop that, a substantially transparent conductive material, both these additional deposits taking the form of a closely spaced, reticulated network of relatively thin, substantially parallel vertically-aligned and substantially parallel horizontally-aligned lines defining a conductive grid separated from the aluminized imaging target by the insulating material. The sensing grid 122 thereby formed thus comprises a series of relatively and selectively closely spaced grid strips or wires bounding plural apertures through which the swept electron beam operatively passes to generate an image on the screen 124. The deposited insulating material may, for example, comprise silicon dioxide, and the deposited conductive material, for example, may be aluminum of a width appropriate for avoiding image-degrading interference with the electron beam as it impinges on the imaging screen and which is, therefore, effectively transparent. The insulating and conductive materials disposed supportedly atop the conventional imaging screen may be selectively deposited in the final intended configuration, or deposited over a greater-than-necessary area of the screen and then selectively reconfigured as by etching or photolithography or any appropriate method or means.

With the single beam monochrome imaging tube thus modified to incorporate a sensing grid 122 in closely spaced but electrically insulated relation to the imaging screen 124, a sensing device 126, preferably a current sensing device, is connected between the sensing grid and imaging screen as has been previously described in connection with the color CRT embodiments of the invention. The imaging screen is, of course, connected to a high potential such as the anode voltage of the tube to provide the intended current flow through sensing device 126 as the beam is operatively swept across the screen. As should be apparent, the sensing device may for example take the form of the electromagnetically-coupled coils 68, 70 of FIG. 1, or of the optically-coupled LED and optical sensor 100, 104 of FIG. 2, or any other approriate arrangement in accordance with the invention.

The time-varying periodic signal operatively developed by sensing device 126 may be incorporated in any or all of the ways heretofore described in conjunction with the plural-beam color imaging tube 10—with the obvious exception of adjusting convergence of multiple electron beams—for improving the quality of images produced on the monochrome tube screen 124. Thus, beam focus may be adjusted at power-up and/or periodically or continuously during imaging operation of the tube. Horizontal and/or vertical linearity may be adjusted by stabilizing the beam sweep velocity to eliminate geometric distortion of images produced on the screen. Absolute beam position on the imaging screen may be obtained for a variety of uses in enhancing image reproduction and quality by appropriately applying the control signal from the sensing device 126 to a counter such, for example, as is illustrated in FIG. 4. These and other applications for utilizing the control signal derived from the current sensor connecting the sensing grid and imaging screen for improving image quality are all within the scope and contemplation of the invention.

While there have been shown and described and pointed out fundamental novel features of the invention as applied to preferred embodiments thereof, it will be understood that various omissions and substitutions and changes in the form and details of the devices illustrated and in their operation, and in the methods of the invention, may be made by those skilled in the art without departing from the spirit of the invention. It is the intention, therefore, to be limited only as indicated by the scope of the claims appended hereto.

What is claimed is:

1. Apparatus for creating an image of enhanced quality on an imaging screen of a cathode ray tube, comprising:

a cathode ray tube comprising:
  a. means for generating an electron beam;
  b. an imaging screen spaced from said beam generating means;
  c. deflecting means for directing said electron beam from said beam generating means through substantially continuous scanning movement in a given sweep direction across said imaging screen to produce an image on said imaging screen;
  d. a screen grid having a plurality of apertures spaced across the screen grid in said sweep direction of the electron beam, said screen grid being disposed within the path of said electron beam closely proximate said imaging screen so that as the electron beam scans in said sweep direction it successively passes through said apertures to impinge and thereby create an image on said imaging screen, and the beam is at least partly intercepted by said screen grid and thereby at least partly prevented from impinging on said imaging screen as said beam scans in said sweep direction across screen grid locations intermediate successive apertures; and
  e. means operable for controlling a characteristic affecting the quality of an image produced on said imaging screen by said electron beam, comprising said deflecting means and lens means for focusing said electron beam on said imaging screen;

means connecting said screen grid and imaging screen for deriving a time-varying signal produced as said electron beam continuously scans in said sweep direction across said screen grid and varying between a minimum amplitude when the scanning beam successively passes through each said aperture and a maximum amplitude as the scanning beam is at least partly intercepted by said screen grid intermediate successive apertures whereby a time-varying current flow between said screen grid and imaging screen is established through said connecting means as the beam scans in said sweep direction along the screen grid across transitions between successive apertures in said sweep direction; and means for generating from said time-varying signal a control signal and for applying said control signal to at least one of said image characteristic controlling means of the cathode ray tube for improving the operation of said at least one controlling means and thereby enhancing the quality of an image produced by said scanning electron beam on said imaging screen.

2. Apparatus in accordance with claim 1, wherein said control signal is dynamically adjusted by said control signal generating means in response to said time-varying signal to minimize said minimum amplitude and thereby to minimize impingement of said electron beam on the screen grid as said scanning beam passes through each said screen grid aperture.

3. Apparatus in accordance with claim 1, said connecting means comprising coil means disposed within the interior of said cathode ray tube and connecting said screen grid and imaging screen for providing a current path between said screen grid and imaging screen.

4. Apparatus in accordance with claim 3, said connecting means further comprising signal pick-up means disposed exterior of said cathode ray tube and in sufficient proximity to said coil means so that said time-varying signal is electromagnetically coupled from said coil means to said pick-up means.

5. Apparatus in accordance with claim 4, wherein said signal pick-up means comprises a pick-up coil.

6. Apparatus in accordance with claim 1, said connecting means comprising light emitting diode means disposed within the interior of said cathode ray tube and connecting said screen grid and imaging screen for providing a current path between said screen grid and imaging screen and being operably illuminated by and in substantial proportion to electric current flowing therethrough between said screen grid and imaging screen.

7. Apparatus in accordance with claim 6, said connecting means further comprising optical sensing means disposed exterior of said cathode ray tube and in optical communication with said diode means for generating said time-varying signal in response and in substantial proportion to said illumination of said diode means.

8. Apparatus in accordance with claim 1, further comprising processing means for generating from said time-varying signal an output signal related to the then current position of the scanning electron beam on said imaging screen.

9. Apparatus in accordance with claim 8, wherein said processing means comprises counter means for generating a count incremented by each said variation of said time-varying signal from said minimum to said maximum amplitude thereof.

10. Apparatus in accordance with claim 1, wherein said time-varying signal is periodic, said control signal generating means comprising means for adjusting the control signal to stabilize the frequency of said time-varying signal and for applying said control signal to said deflecting means to maintain a constant linear beam scanning velocity and thereby substantially eliminate linearity-related geometric distortion of images created on the imaging screen.

11. Apparatus in accordance with claim 1 wherein said electron beam generating means comprises means for generating a plurality of electron beams, and said controlling means of the cathode ray tube further comprises means for selectively deflecting said plural electron beams to cause said beams to converge at said screen grid.

12. In combination:
   a cathode ray tube comprising means for generating an electron beam, an imaging screen spaced from said beam generating means, deflecting means for directing said electron beam through substantially continuous scanning movement in a sweep direction across said imaging screen to produce an image on the imaging screen, and lens means for focusing the electron beam on said imaging screen; and
   apparatus for improving the clarity of the image produced on the imaging screen, comprising:
      a screen grid having a plurality of apertures spaced across the screen grid in said sweep direction of the electron beam, said screen grid being disposed in said tube within the path of the scanning electron beam so that as the electron beam scans in said sweep direction it successively passes through said apertures to impinge and thereby create an image on said imaging screen, and so that the beam is at least partly intercepted by the screen grid and thereby at least partly prevented from impinging on the imaging screen as it scans in said sweep direction across screen grid locations intermediate successive apertures;
      current sensing means connecting said screen grid and said imaging screen to define a time-varying current flow through said sensing means as the electron beam scans in said sweep direction across the screen grid and a control signal which varies with said current flow between a minimum amplitude when the scanning beam successively passes through each said aperture and a maximum amplitude as the scanning beam is at least partly intercepted by the screen grid intermediate successive apertures as the beam scans in said sweep direction, whereby said time-varying current flow is defined as the beam scans along the screen grid in said sweep direction across transitions between successive apertures in said sweep direction; and
      means for generating a correction signal and for applying said correction signal to at least one of the deflecting means and the lens means, said correction signal being dependent on said control signal and being dynamically adjusted to minimize said minimum amplitude and thereby minimize impingement of the electron beam on the screen grid as the scanning beam passes through each said aperture, whereby an image of improved clarity is created on said imaging screen.

13. The combination of claim 12, said current sensing means comprising coil means disposed within the interior of said cathode ray tube and connecting said screen grid and imaging screen for providing a current path between said screen grid and imaging screen.

14. The combination of claim 13, said current sensing means further comprising signal pick-up means disposed exterior of said cathode ray tube and in sufficient proximity to said coil means so that said time-varying signal is electromagnetically coupled from said coil means to said pick-up means.

15. The combination of claim 14, wherein said signal pick-up means comprises a pick-up coil.

16. The combination of claim 12, said current sensing means comprising light emitting diode means disposed within the interior of said cathode ray tube and connecting said screen grid and imaging screen for providing a current path between said screen grid and imaging screen and being operably illuminated by and in substantial proportion to electric current flowing therethrough between said screen grid and imaging screen.

17. The combination of claim 16, said current sensing means further comprising optical sensing means disposed exterior of said cathode ray tube and in optical communication with said diode means for generating said time-varying signal in response and in substantial proportion to said illumination of said diode means.

18. In combination:
   a cathode ray tube comprising means for generating an electron beam, an imaging screen spaced from said beam generating means, deflecting means for directing said electron beam through substantially continuous scanning movement in a sweep direction across said imaging screen to produce an image on the imaging screen, and lens means for focusing the electron beam on said imaging screen; and
   apparatus for correcting misfocussing of the electron beam and therefore of an image produced on the imaging screen, comprising:
      a screen grid having a plurality of apertures spaced across the screen grid in said sweep direction of the electron beam, said screen grid being disposed in said tube within the path of the scanning electron beam so that as the electron beam scans in said sweep direction it successively passes through said apertures to impinge and thereby create an image on said imaging screen, and so that the beam is at least partly intercepted by the screen grid and thereby at least partly prevented from impinging on the imaging screen as it scans in said sweep direction across screen grid locations intermediate successive apertures;
      current sensing means connecting said screen grid and said imaging screen to define a time-varying current flow through said sensing means as the electron beam scans in said sweep direction across the screen grid and a control signal which varies with said current flow between a minimum amplitude when the scanning beam successively passes through each said aperture and a maximum amplitude as the scanning beam is at least partly intercepted by the screen grid intermediate successive apertures as the beam scans in said sweep direction, whereby said time-varying current flow is defined as the beam scans across the screen grid in said sweep direction across transitions between successive apertures in said sweep direction; and means for generating a correction signal and for applying said correction signal to the lens means, said correction signal being dependent on said control signal and being dynamically adjusted to minimize said minimum amplitude voltage and thereby minimize impingement of the electron beam on the screen grid as the scanning beam passes through each said aperture, whereby misfocussing of the electron beam on the imaging screen is corrected resulting in an image of improved sharpness.

19. The combination of claim 18, further comprising insulating means disposed on the imaging screen, and said screen grid being mounted on said insulating means so that the screen grid is physically and electrically separated from the imaging screen by said insulating means.

20. The combination of claim 19, wherein said insulating means comprises a substantially transparent insulating material deposited on a face of the imaging screen.

21. The combination of claim 20, wherein said insulating material is silicon dioxide.

22. The combination of claim 20, wherein said screen grid comprises a grid formed of a conductive material deposited on said insulating material.

23. The combination of claim 22, wherein said conductive material is aluminum.

24. The combination of claim 20, wherein said screen grid comprises a grid formed of a substantially transparent conductive material deposited on said insulating material.

25. The combination of claim 18, said current sensing means comprising a sensing coil connecting said screen grid and imaging screen and through which said time-varying current flow is defined, said sensing coil being disposed within the interior of the tube, and a pick-up coil disposed exterior of the tube in sufficient proximity to said sensing coil so that said time-varying current flow electromagnetically induces in said pick-up coil said correspondingly time-varying control signal for application to said correction signal generating means.

26. The combination of claim 25, wherein said sensing coil is mounted on an interior wall surface of said tube and said pick-up coil is mounted on an exterior wall surface of said tube.

27. The combination of claim 18, said current sensing means comprising a light emitting diode connecting said screen grid and imaging screen and through which said time-varying varying current flow is defined, said diode being operatively illuminated by and in substantial proportion to said current flow therethrough and being disposed within the interior of the tube, and optical sensing means disposed exterior of the tube in optical communication with said diode for generating in response to said diode illumination a time-varying control signal substantially proportional to said diode illumination for application to said correction signal generating means.

28. In combination:
a cathode ray tube comprising:
 a. means for generating a plurality of electron beams;
 b. an imaging screen spaced from said beam generating means;
 c. a screen grid having a plurality of apertures spaced across the screen grid in a sweep direction of the electron beams, said screen grid being disposed closely proximate said imaging screen within the path of the electron beams;
 d. first deflecting means for directing said electron beams through substantially continuous scanning movement in said sweep direction across said screen grid so that as the electron beams scan in said sweep direction they successively pass through said apertures to impinge and thereby create an image on said imaging screen, and the beams are at least partly intercepted by the screen grid and thereby at least partly prevented from impinging on the imaging screen as the beams scan in said sweep direction across screen grid locations intermediate successive apertures;
 e. second deflecting means for causing said plural scanning electron beams to converge at said screen grid; and
 f. lens means for focusing the electron beam on said imaging screen; and
apparatus for dynamically improving the accuracy of convergence of the plural beams at said screen grid and thereby enhancing the quality of the image produced on the imaging screen, comprising:
 a. current sensing means connecting said screen grid and said imaging screen to define a time-varying current flow through said sensing means as the plural electron beams scan in said sweep direction across the screen grid and a control signal which varies with said current flow between a minimum amplitude when the plural scanning beams successively pass through each said aperture and a maximum amplitude as the plural scanning beams are at least partly intercepted by the screen grid intermediate successive apertures as the beams scan in said sweep direction, whereby said time-varying current flow is defined as the beams scan across the screen grid in said sweep direction across transitions between successive apertures in said sweep direction; and
 b. means for generating a correction signal and for applying said correction signal to said second deflecting means for adjusting the accuracy of convergence of said plural beams at said screen grid, said correction signal being dependent on said control signal and being dynamically adjusted to minimize said minimum signal and thereby minimize impingement of the electron beams on the screen grid as the plural scanning beams pass through each said aperture, whereby an image of improved clarity is created on said imaging screen.

29. The combination of claim 28, said connecting means comprising coil means disposed within the interior of said cathode ray tube and connecting said screen grid and imaging screen for providing a current path between said screen grid and imaging screen.

30. The combination of claim 29, said connecting means further comprising signal pick-up means disposed exterior of said cathode ray tube and in sufficient proximity to said coil means so that said time-varying signal is electromagnetically coupled from said coil means to said pick-up means.

31. The combination of claim 30, wherein said signal pick-up means comprises a pick-up coil.

32. The combination of claim 28, said connecting means comprising light emitting diode means disposed within the interior of said cathode ray tube and connecting said screen grid and imaging screen for providing a current path between said screen grid and imaging screen and being operably illuminated by and in substantial proportion to electric current flowing therethrough between said screen grid and imaging screen.

33. The combination of claim 32, said connecting means further comprising optical sensing means disposed exterior of said cathode ray tube and in optical communication with said diode means for generating said time-varying signal in response and in substantial proportion to said illumination of said diode means.

34. A method of correcting misconvergence of a plurality of substantially continuously moving scanning electron beams at a screen grid having a plurality of apertures spaced across the screen grid in a sweep direction of the electron beams, the screen grid being disposed substantially adjacent the imaging screen of a cathode ray tube having deflection means operable for directing the paths of the electron beams toward the screen grid for substantially continuous scanning movement of the electron beams across the screen grid in said sweep direction, comprising the steps of:

connecting the screen grid to the imaging screen by current sensing means to provide a voltage differential which varies, as the electron beams scan in said sweep direction across the screen grid and thus successively through the apertures therein to impinge on the imaging screen for creating an image on the imaging screen, between a first voltage as the beams scan across each said aperture in the screen grid and a second voltage as the beams scan in said sweep direction across the screen grid between successive apertures whereby said voltage differential is defined, as the electron beams scan in said sweep direction, at transitions between successive apertures spaced across the screen grid in said sweep direction;

generating from said time-varying voltage differential a correction signal for application to the deflection means to adjust the path of at least one of the electron beams and thereby adjust convergence of the electron beams at the screen grid;

applying said correction signal to the deflection means to adjust beam convergence at the screen grid;

whereby said correction signal is generated by dynamically maximizing the difference between said first and second voltages whereby the plural electron beams are caused to accurately converge at the screen grid.

35. Apparatus in accordance with claim 1, wherein as the electron beam successively passes through each said aperture it partly impinges on said screen grid.

36. Apparatus in accordance with claim 1, wherein as the electron beam successively passes through each said aperture substantially the entire beam passes through said aperture.

37. The combination of claim 12, wherein as the electron beam successively passes through each said aperture it partly impinges on said screen grid.

38. The combination of claim 12, wherein as the electron beam successively passes through each said aperture substantially the entire beam passes through said aperture.

39. The combination of claim 18, wherein as the electron beam successively passes through each said aperture it partly impinges on said screen grid.

40. The combination of claim 18, wherein as the electron beam successively passes through each said aperture substantially the entire beam passes through said aperture.

41. The combination of claim 28, wherein as the electron beams pass through each said aperture at least one of said beams partly impinges on said screen grid.

42. The combination of claim 28, wherein as the electron beams pass through each said aperture substantially the entirety of each said beam passes through said aperture.

43. Apparatus for creating an image of enhanced quality on an imaging screen of a cathode ray tube, comprising:

a cathode ray tube comprising:
 a. means for generating an electron beam;
 b. an imaging screen spaced from said generating means;
 c. deflecting means for directing said electron beam from said beam generating means through substantially continuous scanning movement in a first direction across said imaging screen to produce an image on said imaging screen;
 d. a screen grid having a plurality of elongated apertures elongated in a second direction transverse to said first direction, said screen grid being disposed within the path of said electron beam closely proximate said imaging screen so that as the electron beam is swept across the imaging screen in said first direction it successively passes through said apertures to impinge and thereby create an image on said imaging screen, and the electron beam is at least partly intercepted by said screen grid and thereby at least partly prevented from impinging on said imaging screen as said beam is swept in said first direction across screen grid locations intermediate successive apertures; and
 e. means operable for controlling a characteristic affecting the quality of an image produced on said imaging screen by said electron beam, comprising said deflecting means and lens means for focusing said electron beam on said imaging screen;

means connecting said screen grid and imaging screen for deriving a time-varying signal produced as said electron beam is swept across said screen grid in said first direction and varying between a minimum amplitude when the swept beam successively passes through each said aperture and a maximum amplitude as the swept beam is at least partly intercepted by said screen grid intermediate successive apertures whereby a time-varying current flow between said screen grid and imaging screen is established through said connecting means; and means for generating from said time-varying signal a control signal and for applying said control signal to at least one of said image characteristic controlling means of the cathode ray tube for improving the operation of said at least one controlling means and thereby enhancing the quality of an image produced by said electron beam on said imaging screen.

44. Apparatus in accordance with claim 43, wherein said second direction of screen grid apertures elongation and said first direction in which the electron beam is swept across the imaging screen are substantially perpendicular.

45. Apparatus in accordance with claim 43, wherein said control signal is dynamically adjusted by said control signal generating means in response to said time-varying signal to minimize said minimum amplitude and thereby to minimize impingement of said electron beam on the screen grid as said beam passes through each said screen grid aperture.

46. Apparatus in accordance with claim 43, said connecting means comprising coil means disposed within the interior of said cathode ray tube and connecting said screen grid and imaging screen for providing a current path between said screen grid and imaging screen.

47. Apparatus in accordance with claim 46, said connecting means further comprising signal pick-up means disposed exterior of said cathode ray tube and in sufficient proximity to said coil means so that said time-varying signal is electromagnetically coupled from said coil means to said pick-up means.

48. Apparatus in accordance with claim 47, wherein said signal pick-up means comprises a pick-up coil.

49. Apparatus in accordance with claim 43, said connecting means comprising light emitting diode means disposed within the interior of said cathode ray tube and connecting said screen grid and imaging screen for providing a current path between said screen grid and imaging screen and being operably illuminated by and in substantial proportion to electric current flowing therethrough between said screen grid and imaging screen.

50. Apparatus in accordance with claim 49, said connecting means further comprising optical sensing means disposed exterior of said cathode ray tube and in optical communication with said diode means for generating said time-varying signal in response and in substantial proportion to said illumination of said diode means.

51. Apparatus in accordance with claim 43, further comprising processing means for generating from said time-varying signal an output signal related to the then current position of the electron beam on said imaging screen.

52. Apparatus in accordance with claim 51, wherein said processing means comprises counter means for generating a count incremented by each said variation of said time-varying signal from said minimum to said maximum amplitude thereof.

53. Apparatus in accordance with claim 43, wherein said time-varying signal is periodic, said control signal generating means comprising means for adjusting the control signal to stabilize the frequency of said time-varying signal and for applying said control signal to said deflecting means to maintain a constant linear beam scanning velocity and thereby substantially eliminate linearity-related geometric distortion of images created on the imaging screen.

54. Apparatus in accordance with claim 43 wherein said electron beam generating means comprises means for generating a plurality of electron beams, and said controlling means of the cathode ray tube further comprises means for selectively deflecting said plural electron beams to cause said beams to converge at said screen grid.

55. In combination:
a cathode ray tube comprising means for generating all electron beam, an imaging screen spaced from said beam generating means, deflecting means for directing said electron beam through substantially continuous swept movement in a first direction across said imaging screen to produce an image on the imaging screen, and lens means for focusing the electron beam on said imaging screen; and
apparatus for improving the clarity of the image produced on the imaging screen, comprising:
a screen grid having a plurality of elongated apertures elongated in a second direction transverse to said first direction, said screen grid being disposed in said tube within the path of the swept electron beam so that the swept beam successively passes through said apertures to impinge and thereby create an image on said imaging screen, and so that the beam is at least partly intercepted by the screen grid and thereby at least partly prevented from impinging on the imaging screen as the beam is swept in said first direction across screen grid locations intermediate successive apertures:
current sensing means connecting said screen grid and said imaging screen to define a time-varying current flow through said sensing means as the electron beam is swept in said first direction across the screen grid and a control signal which varies with said current flow between a minimum amplitude when the swept beam successively passes through each said aperture and a maximum amplitude as the swept beam is at least partly intercepted by the screen grid intermediate successive apertures; and
means for generating a correction signal and for applying said correction signal to at least one of the deflecting means and the lens means, said correction signal being dependent on said control signal and being dynamically adjusted to minimize said minimum amplitude and thereby minimize impingement of the electron beam on the screen grid as the swept beam passes through each said aperture, whereby an image of improved clarity is created on said imaging screen.

56. The combination of claim 55, wherein said first direction of substantially continuous swept movement of the electron beam and said second direction of screen grid apertures elongation are substantially perpendicular.

57. The combination of claim 55, said current sensing means comprising coil means disposed within the interior of said cathode ray tube and connecting said screen grid and imaging screen for providing a current path between said screen grid and imaging screen.

58. The combination of claim 56, said current sensing means further comprising signal pick-up means disposed exterior of said cathode ray tube and in sufficient proximity to said coil means so that said time-varying signal is electromagnetically coupled from said coil means to said pick-up means.

59. The combination of claim 57, wherein said signal pick-up means comprises a pick-up coil.

60. The combination of claim 55, said current sensing means comprising light emitting diode means disposed within the interior of said cathode ray tube and connecting said screen grid and imaging screen for providing a current path between said screen grid and imaging screen and being operably illuminated by and in substantial proportion to electric current flowing therethrough between said screen grid and imaging screen.

61. The combination of claim 60, said current sensing means further comprising optical sensing means disposed exterior of said cathode ray tube and in optical communication with said diode means for generating said time-varying signal in response and in substantial proportion to said illumination of said diode means.

62. In combination:
a cathode ray tube comprising means for generating an electron beam, an imaging screen spaced from said beam generating means, deflecting means for directing said electron beam through substantially continuous scanning movement in a first direction across said imaging screen to produce an image on the imaging screen, and lens means for focusing the electron beam on said imaging screen; and
apparatus for correcting misfocussing of the electron beam and therefore of an image produced on the imaging screen, comprising:
a screen grid having a plurality of elongated apertures elongated in a second direction transverse to said first direction, said screen grid being disposed in said tube within the path of the scanning electron beam so that the scanning beam successively passes through said apertures to impinge and thereby create an image on said imaging screen, and so that the beam is at least partly intercepted by the screen grid and thereby at least partly prevented from impinging on the imaging screen as it scans in said first direction across screen grid locations intermediate successive apertures;
current sensing means connecting said screen grid and said imaging screen to define a time-varying current flow through said sensing means as the electron beam scans in said first direction across the screen grid and a control signal which varies with said current flow between a minimum amplitude when the scanning beam successively passes through each said aperture and a maximum amplitude as tire scanning beam is at least partly intercepted by tire screen grid intermediate successive apertures; and
means for generating a correction signal and for applying said correction signal to the lens means, said correction signal being dependent on said control signal and being dynamically adjusted to minimize said minimum amplitude voltage and thereby minimize impingement of the electron beam on tire screen grid as the scanning beam passes through each said aperture, whereby misfocussing of the electron beam on the imaging screen is corrected resulting in an image of improved sharpness.

63. The combination of claim 62, wherein said first direction of substantially continuous scanning movement of the electron beam and said second direction of screen grid apertures elongation are substantially perpendicular.

64. The combination of claim 62, further comprising insulating means disposed on the imaging screen, and said screen grid being mounted on said insulating means so that the screen grid is physically and electrically separated from the imaging screen by said insulating means.

65. The combination of claim 64, wherein said insulating means comprises a substantially transparent insulating material deposited on a face of tire imaging screen.

66. The combination of claim 65, wherein said insulating material is silicon dioxide.

67. The combination of claim 65, wherein said screen grid comprises a grid formed of a conductive material deposited on said insulating material.

68. The combination of claim 67, wherein said conductive material is aluminum.

69. The combination of claim 65, wherein said screen grid comprises a grid formed of a substantially transparent conductive material deposited on said insulating material.

70. The combination of claim 62, said current sensing means comprising a sensing coil connecting said screen grid and imaging screen and through which said time-varying current flow is defined, said sensing coil being disposed within the interior of the tube, and a pick-up coil disposed exterior of the tube in sufficient proximity to said sensing coil so that said time-varying current flow electromagnetically induces in said pick-up coil said correspondingly time-varying control signal for application to said correction signal generating means.

71. The combination of claim 70, wherein said sensing coil is mounted on an interior wall surface of said tube and said pick-up coil is mounted on an exterior wall surface of said tube.

72. The combination of claim 62, said current sensing means comprising a light emitting diode connecting said screen grid and imaging screen and through which said time-varying current flow is defined, said diode being operatively illuminated by and in substantial proportion to said current flow therethrough and being disposed within the interior of the tube, and optical sensing means disposed exterior of the tube in optical communication with said diode for generating in response to said diode illumination a time-varying control signal substantially proportional to said diode illumination for application to said correction signal generating means.

73. In combination:
a cathode ray tube comprising:
a. means for generating a plurality of electron beams;
b. an imaging screen spaced from said beam generating means;
c. a screen grid having a plurality of elongated apertures elongated in a first direction, said screen grid being disposed closely proximate said imaging screen within the path of the electron beams;
d. first deflecting means for directing said electron beams through substantially continuous scanning movement across said screen grid in a second direction transverse to said first direction so that the scanning beams successively pass through said apertures to impinge and thereby create an image on said imaging screen, and the beams are at least partly intercepted by the screen grid and thereby at least partly prevented from impinging on the imaging screen as the beams scan in said second direction across screen grid locations intermediate successive apertures;
e. second deflecting means for causing said plural scanning electron beams to converge at said screen grid; and
f. lens means for focusing the electron beam on said imaging screen; and
apparatus for dynamically improving the accuracy of convergence of the plural beams at said screen grid and thereby enhancing the quality of the image produced on the imaging screen, comprising:

a. current sensing means connecting said screen grid and said imaging screen to define a time-varying current flow through said sensing means as the plural electron beams scan across the screen grid in said second direction and a control signal which varies with said current flow between a minimum amplitude when the plural scanning beams successively pass through each said aperture and a maximum amplitude as the plural scanning beams are at least partly intercepted by the screen grid intermediate successive apertures; and b. means for generating a correction signal and for applying said correction signal to said second deflecting means for adjusting the accuracy of convergence of said plural beams at said screen grid, said correction signal being dependent on said control signal and being dynamically adjusted to minimize said minimum signal and thereby minimize impingement of the electron beams on the screen grid as the plural scanning beams pass through each said aperture, whereby an image of improved clarity is created on said imaging screen.

74. The combination of claim 73, wherein said first direction of screen grid apertures elongation and said second direction of substantially continuous scanning movement of said electron beams are substantially perpendicular.

75. The combination of claim 73, said connecting means comprising coil means disposed within the interior of said cathode ray tube and connecting said screen grid and imaging screen for providing a current path between said screen grid and imaging screen.

76. The combination of claim 75, said connecting means further comprising signal pick-up means disposed exterior of said cathode ray tube and in sufficient proximity to said coil means so that said time-varying signal is electromagnetically coupled from said coil means to said pick-up means.

77. The combination of claim 76, wherein said signal pick-up means comprises a pick-up coil.

78. The combination of claim 73, said connecting means comprising light emitting diode means disposed within the interior of said cathode ray tube and connecting said screen grid and imaging screen for providing a current path between said screen grid and imaging screen and being operably illuminated by and in substantial proportion to electric current flowing therethrough between said screen grid and imaging screen.

79. The combination of claim 78, said connecting means further comprising optical sensing means disposed exterior of said cathode ray tube and in optical communication with said diode means for generating said time-varying signal in response and in substantial proportion to said illumination of said diode means.

80. A method of correcting misconvergence of a plurality of substantially continuously moving scanning electron beams at a screen grid having a plurality of elongated apertures elongated in a first direction, the screen grid being disposed substantially adjacent the imaging screen of a cathode ray tube having deflection means operable for directing the paths of the electron beams toward the screen grid for substantially continuous scanning movement of the electron beams across the screen grid in a second direction transverse to said first direction, comprising the steps of:

connecting the screen grid to the imaging screen by current sensing means to provide a voltage differential which varies, as the electron beams scan in said second direction across the screen grid and thus successively through the apertures therein to impinge on the imaging screen for creating an image on the imaging screen, between a first voltage as the beams scan across each said aperture in the screen grid and a second voltage as the beams scan across the screen grid in said second direction between successive apertures;

generating from said time-varying voltage differential a correction signal for application to the deflection means to adjust the path of at least one of the electron beams and thereby adjust convergence of the electron beams at the screen grid; and applying said correction signal to the deflection means to adjust beam convergence at the screen grid;

whereby said correction signal is generated by dynamically maximizing the difference between said first and second voltages whereby the plural electron beams are caused to accurately converge at the screen grid.

81. The method of claim 80, wherein said first direction of screen grid apertures elongation and said second direction of substantially continuous scanning movement of the electron beams are substantially perpendicular.

82. Apparatus for creating an image of enhanced quality on an imaging screen of a cathode ray tube, comprising:

a cathode ray tube comprising:

a. means for generating an electron beam;

b. an imaging screen spaced from said beam generating means;

c. deflecting means for directing said electron beam from said beam generating means through substantially continuous scanning movement in a sweep direction across said imaging screen to produce an image on said imaging screen;

d. a screen grid having a plurality of apertures spaced across the screen grid in said sweep direction of the electron beam said screen grid being disposed within the path of said electron beam closely proximate said imaging screen so that as the electron beam scans in said sweep direction it successively passes through said apertures to impinge and thereby create an image on said imaging screen, and the beam is at least partly intercepted by said screen grid and thereby at least partly prevented from impinging on said imaging screen as said beam scans in said sweep direction across screen grid locations intermediate successive apertures; and e. means operable for controlling a characteristic affecting the quality of an image produced on said imaging screen by said electron beam, comprising said deflecting means and lens means for focusing said electron beam on said imaging screen;

means connecting said screen grid and imaging screen for sensing a time-varying current between said screen grid and imaging screen as the electron beam sweeps in said scanning direction and is intercepted by said screen grid at transitions between successive apertures spaced across the screen grid in said scanning direction; and means for generating from said time-varying current a control signal and for applying said control signal to at least one of said image characteristic controlling means of the cathode ray tube for improving the operation of said at least one controlling means and thereby enhancing the quality of an image produced by said scanning electron beam on said imaging screen.

83. Apparatus in accordance with claim 82, wherein said control signal is dynamically adjusted by said control signal generating means in response to said time-varying current to minimize the amplitude of said sensed current and thereby minimize impingement of said electron beam on the screen grid as said scanning beam passes through each said screen grid aperture.

84. Apparatus in accordance with claim 82, said connecting means comprising coil means disposed within the interior of said cathode ray tube and connecting said screen grid and imaging screen for providing a current path between said screen grid and imaging screen.

85. Apparatus in accordance with claim 84, said connecting means further comprising signal pick-up means disposed exterior of said cathode ray tube and in sufficient proximity to said coil means so that a time-varying signal corresponding to said time-varying current is electromagnetically coupled from said coil means to said pick-up means.

86. Apparatus in accordance with claim 85, wherein said signal pick-up means comprises a pick-up coil.

87. Apparatus in accordance with claim 82, said connecting means comprising light emitting diode means disposed within the interior of said cathode ray tube and connecting said screen grid and imaging screen for providing a current path between said screen grid and imaging screen and being operably illuminated by and in substantial proportion to electric current flowing therethrough between said screen grid and imaging screen.

88. Apparatus in accordance with claim 87, said connecting means further comprising optical sensing means disposed exterior of said cathode ray tube and in optical communication with said diode means for generating said time-varying signal in response and in substantial proportion to said illumination of said diode means.

89. Apparatus in accordance with claim 82, further comprising processing means for generating from said time-varying current an output signal related to the then current position of the scanning electron beam on said imaging screen.

90. Apparatus in accordance with claim 81, wherein said processing means comprises counter means for generating a count incremented by variations of said time-varying current.

91. Apparatus in accordance with claim 82, wherein said time-varying current is periodic, said control signal generating means comprising means for adjusting the control signal to stabilize the frequency of said time-varying current and for applying said control signal to said deflecting means to maintain a constant linear beam scanning velocity and thereby substantially eliminate linearity-related geometric distortion of images created on the imaging screen.

92. Apparatus in accordance with claim 82 wherein said electron beam generating means comprises means for generating a plurality of electron beams, and said controlling means of the cathode ray tube further comprises means for selectively deflecting at least one of said plural electron beams so as to cause said beams to converge at said screen grid.

* * * * *